US011178399B2

(12) United States Patent
Dong et al.

(10) Patent No.: US 11,178,399 B2
(45) Date of Patent: Nov. 16, 2021

(54) PROBABILITY INITIALIZATION FOR VIDEO CODING

(71) Applicant: QUALCOMM Incorporated, San Diego, CA (US)

(72) Inventors: Jie Dong, Sunnyvale, CA (US); Amir Said, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/816,016

(22) Filed: Mar. 11, 2020

(65) Prior Publication Data

US 2020/0296378 A1 Sep. 17, 2020

Related U.S. Application Data

(60) Provisional application No. 62/817,475, filed on Mar. 12, 2019, provisional application No. 62/834,297, filed on Apr. 15, 2019, provisional application No. 62/871,519, filed on Jul. 8, 2019.

(51) Int. Cl.
*H04N 19/13* (2014.01)
*H04N 19/44* (2014.01)
*H04N 19/124* (2014.01)
*H04N 19/91* (2014.01)

(52) U.S. Cl.
CPC ........... *H04N 19/13* (2014.11); *H04N 19/124* (2014.11); *H04N 19/44* (2014.11); *H04N 19/91* (2014.11)

(58) Field of Classification Search
CPC ...... H04N 19/13; H04N 19/44; H04N 19/124; H04N 19/91; H04N 19/70
See application file for complete search history.

(56) References Cited

U.S. PATENT DOCUMENTS

| 9,455,744 B2* | 9/2016 | George | H04N 19/52 |
| 9,484,952 B2* | 11/2016 | Guo | H04N 19/13 |
| 2013/0114675 A1* | 5/2013 | Guo | H04N 19/13 375/240.02 |
| 2013/0114691 A1* | 5/2013 | Guo | H04N 19/13 375/240.03 |

(Continued)

OTHER PUBLICATIONS

Bossen F., et al., "JVET Common Test Conditions and Software Reference Configurations for SDR video", Joint Video Experts Team (JVET) of ITU-T SG 16 WP 3 and ISO/IEC JTC 1/SC 29/WG 11, Document: JVET-M1010-V1, 13th Meeting: Marrakech, MA, Jan. 9-18, 2019, pp. 1-6.

(Continued)

*Primary Examiner* — Richard A Hansell, Jr.
(74) *Attorney, Agent, or Firm* — Shumaker & Sieffert, P.A.

(57) ABSTRACT

An example method for entropy decoding of video data includes retrieving a pre-defined initialization value for a context of a plurality of contexts used in a context-adaptive entropy coding process to entropy code a value for a syntax element for an independently codable unit of video data; determining, based on the pre-defined initialization value and in a linear domain, an initial probability state of the context; and entropy decoding, from a bitstream and based on the initial probability state of the context, a bin of the value for the syntax element.

24 Claims, 28 Drawing Sheets

(56) References Cited

U.S. PATENT DOCUMENTS

| | | | |
|---|---|---|---|
| 2014/0092985 A1* | 4/2014 | Kim | H04N 19/129 |
| | | | 375/240.25 |
| 2016/0353111 A1 | 12/2016 | Zhang et al. | |
| 2018/0098072 A1* | 4/2018 | Zhang | H04N 19/91 |
| 2018/0255295 A1* | 9/2018 | Lee | H04N 19/59 |
| 2018/0278967 A1 | 9/2018 | Kerofsky et al. | |
| 2019/0068989 A1* | 2/2019 | Lee | H04N 19/513 |
| 2019/0200043 A1 | 6/2019 | Egilmez et al. | |
| 2019/0246102 A1 | 8/2019 | Cho et al. | |
| 2019/0306533 A1 | 10/2019 | Baylon et al. | |
| 2019/0320177 A1* | 10/2019 | George | H04N 19/174 |
| 2019/0335179 A1* | 10/2019 | Sjoberg | H04N 19/573 |
| 2020/0177911 A1* | 6/2020 | Aono | H04N 19/139 |
| 2020/0213612 A1* | 7/2020 | Liu | H04N 19/176 |
| 2020/0294272 A1* | 9/2020 | Itoh | G06N 3/0454 |
| 2020/0296380 A1* | 9/2020 | Aono | H04N 19/176 |
| 2020/0404305 A1* | 12/2020 | Ye | H04N 19/176 |

OTHER PUBLICATIONS

JVET: "VTM-4.0, Tags, JVET/VVCSoftware_VTM, GitLab", Frank Bossen, https://vcgit.hhi.fraunhofer.de/jvet/VVCSoftware_VTM/-/tags/VTM-4.0, Accessed Jun. 2020, pp. 1-2.

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v6, 301 Pages.

Bross B., et al., "Versatile Video Coding (Draft 7)", Joint Video Experts Team (JVET) of ITU-T SG 16 WP 3 and ISO/IEC JTC 1/SC 29/WG 11, JVET-P2001-v9, 16th Meeting: Geneva, CH, Oct. 1-11, 2019, 490 pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.

Chen J., et al., "JVET-G1001: Algorithm Description of Joint Exploration Test Model 7 (JEM7)", JVET-G1001-V1, Joint Video Exploration Team (JVET)OF ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2, sections 2.1.1.2.3.1.

Dong J., et al., "CE1-1.2 and CE1-2.1: Simplification of CABAC Initialization Process" Document: JVET-O0065-V2, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-8.

Dong J., et al.,"Simplification of CABAC Initialization Process", Document: JVET-N0425, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-3.

Ergen S., "ZigBee/IEEE 802.15.4 Summary", Sep. 10, 2004, 37 Pages.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

"Information technology—Dynamic Adaptive Streaming over HTTP {DASH)—Part 1: Media Presentation Description and Segment Formats," ISO/IEC 23009-1, International Standard, Draft third edition, Jan. 9, 2017, 216 pp.

International Search Report and Written Opinion—PCT/US2020/022355—ISA/EPO—dated Jun. 2, 2020 (14 pp).

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.265, "Series H: Audiovisual and Multimedia Systems, Infrastructure of Audiovisual Services—Coding of Moving Video, High efficiency Video Coding," The International Telecommunication Union. Dec. 2016, 664 Pages.

Kirchhoffer H., et al., "CE1-related: Simplification of JVET-O0191 using 4 or 6 bit per initialization value" Document: JVET-O0946-V4, Joint Video Experts Team (JVET) of ITU-T SG 16 WP 3 and ISO/IEC JTC 1/SC 29/WG 11, JVET-O0946-V5, 15th Meeting: Gothenburg, SE, Jul. 3-12, 2019, pp. 1-11.

Kirchhoffer H., et al.,"Simplification of the Initialization Process for Context Variables", Document: JVET-N0301, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-3.

Marpe D., et al., "Context-Based Adaptive Binary Arithmetic Coding in the H.264/AVC Video Compression Standard", IEEE Transactions on Circuits and Systems for Video Technology, vol. 13, No. 7, Jul. 1, 2003, pp. 620-636, XP055120073, ISSN: 1051-8215, DOI: 10.1109/TCSVT.2003.815173.

Ohm J-R., et al., "MPEG-4 Advanced Video Coding", MPEG Doc#: N7314, Jul. 2005, 11 Pages.

Stegemann J., et al.,"CES-related: Clean up of the Context model Initialization Process for CE5.1.5 and CE5.1.6" Document: JVET-M0772, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-4.

Sze V., et al., "High Throughput CABAC Entropy Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1778-1791, XP011487151, ISSN: 1051-8215, DOI: 10.1109/TCSVT.2012.2221526.

* cited by examiner

PROBABILITY INITIALIZATION FOR VIDEO CODING

This application claims the benefit of U.S. Provisional Application No. 62/817,475, filed Mar. 12, 2019, U.S. Provisional Application No. 62/834,297, filed Apr. 15, 2019, and U.S. Provisional Application No. 62/871,519, filed Jul. 8, 2019, the entire contents each of which are incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for probability initialization for arithmetic coding for video compression. For instance, a video coder may set the initial probability state(s) of each context model used in a binary arithmetic coder. The process may be invoked at the beginning of entropy encoding or decoding an independently decodable unit, such as a slice or a tile.

As one example, a method for entropy coding of video data includes obtaining a pre-defined initialization value for a context of a plurality of contexts used in a context-adaptive entropy coding process to entropy code a value for a syntax element for an independently codable unit of video data; determining, based on the pre-defined initialization value and in a linear domain, an initial probability state of the context; and entropy coding, based on the initial probability state of the context, a bin of the value for the syntax element.

As another example, a device includes a memory storing video data; and one or more processors implemented in circuitry and configured to: obtain a pre-defined initialization value for a context of a plurality of contexts used in a context-adaptive entropy coding process to entropy code a value for a syntax element for an independently codable unit of video data; determine, based on the pre-defined initialization value and in a linear domain, an initial probability state of the context; and entropy code, based on the initial probability state of the context, a bin of the value for the syntax element.

As another example, a device includes means for obtaining a pre-defined initialization value for a context of a plurality of contexts used in a context-adaptive entropy coding process to entropy code a value for a syntax element for an independently codable unit of video data; means for determining, based on the pre-defined initialization value and in a linear domain, an initial probability state of the context; and means for entropy coding, based on the initial probability state of the context, a bin of the value for the syntax element.

As another example, a computer-readable storage medium stores instructions that, when executed, cause one or more processors of a video coder to: obtain a pre-defined initialization value for a context of a plurality of contexts used in a context-adaptive entropy coding process to entropy code a value for a syntax element for an independently codable unit of video data; determine, based on the pre-defined initialization value and in a linear domain, an initial probability state of the context; and entropy code, based on the initial probability state of the context, a bin of the value for the syntax element.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

In general, this disclosure describes techniques for probability initialization for arithmetic coding for video compression. For instance, a video coder may set the initial probability state(s) of each context model used in a binary arithmetic coder. The process may be invoked at the beginning of entropy encoding or decoding an independently decodable unit, such as a slice.

To perform the initialization, the video coder may obtain a pre-defined initialization value (e.g., initValue) for a context of a plurality of contexts used in a context-adaptive entropy coding process to entropy code a value for a syntax element for a slice of video data. The video coder may determine, based on the pre-defined initialization value and in a logarithmic domain, an initial probability state of the context (e.g., pStateIdx). The video coder may entropy code, based on the initial probability state of the context, a bin of the value for the syntax element.

When coding video data in accordance with some video standards, the video coder may maintain the probability states in the linear domain. For example, as discussed in further detail below, the Context Adaptive Binary Arithmetic Coder (CABAC) adopted in Versatile Video Coding (VVC) may maintain probability states of contexts in the linear domain. Where the initial probability state is determined in the logarithmic domain, video coders may perform various operations to covert the determined initial probability state in the linear domain. For instance, a video coder may use a look-up table (LUT) to convert the initial probability state from the logarithmic domain to the linear domain.

In accordance with one or more techniques of this disclosure, a video coder may directly determine an initial probability state in the linear domain. For instance, the video may determine, based on the pre-defined initialization value, an initial probability state of the context (e.g., pStateIdx) in the linear domain without using a LUT to convert the initial probability state from the logarithmic domain to the linear domain. In this way, the video coder may avoid having to store and/or access a LUT that translates between initial probability states in the linear and logarithmic domains.

Figure 1:
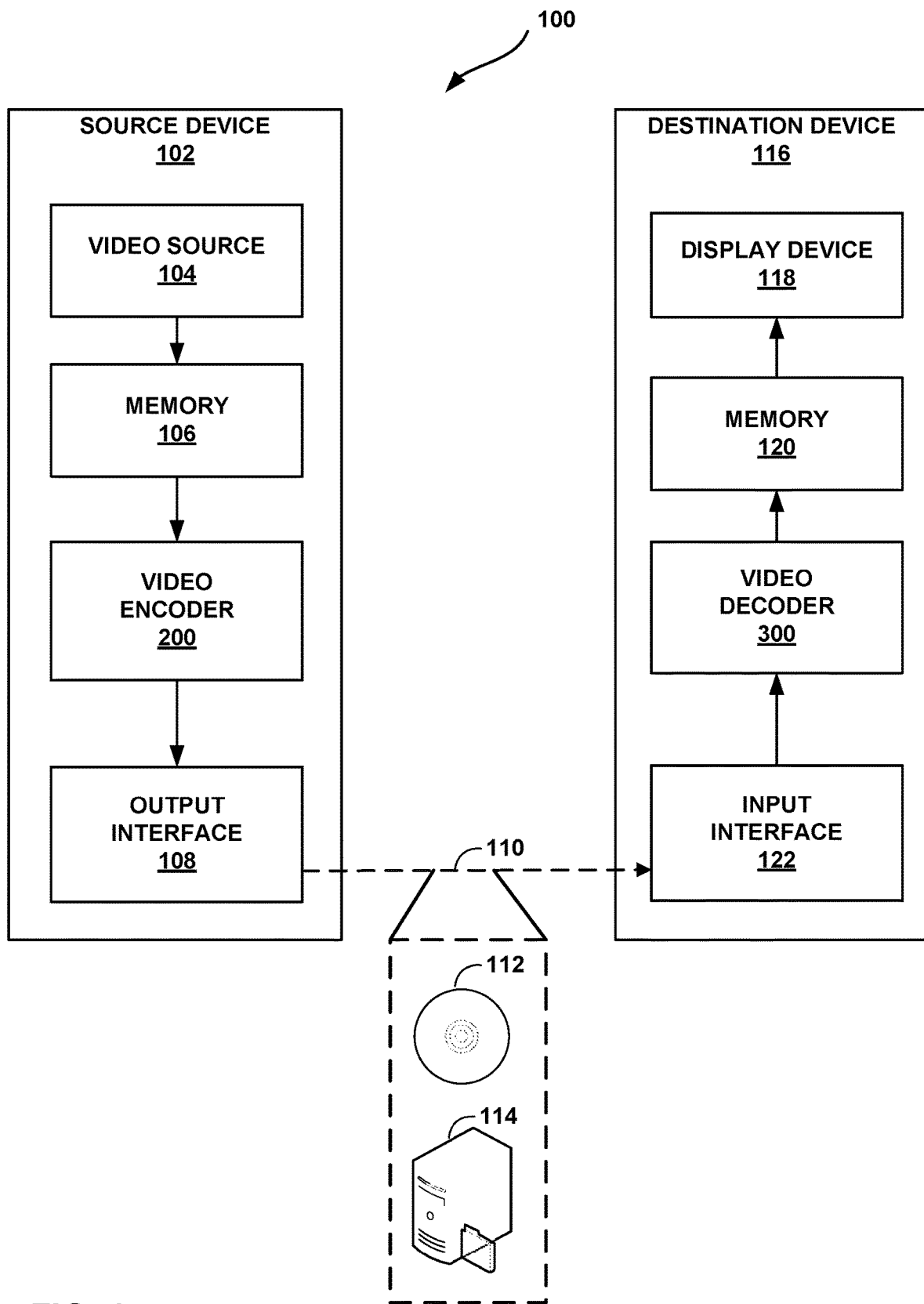
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for probability initialization for arithmetic coding for video compression. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for probability initialization for arithmetic coding for video compression. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, MA, 9-18 Jan. 2019, JVET-M1001-v6 (hereinafter "VVC Draft 4"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

The following section will describe binary arithmetic coding (BAC) and CABAC techniques in more detail. BAC, in general, is a recursive interval-subdividing procedure. BAC is used to encode bins in the CABAC process in the H.264/AVC and H.265/HEVC video coding standards. The output of the BAC coder is a binary stream that represents a value or pointer to a probability within a final coded probability interval. The probability interval is specified by a range ('range') and a lower end value ('low'). Range is the extension of the probability interval. Low is the lower bound of the coding/probability interval.

Application of arithmetic coding to video coding is described in D. Marpe, H. Schwarz, and T. Wiegand "Context-Based Adaptive Binary Arithmetic Coding in the H.264/AVC Video Compression Standard," IEEE Trans. Circuits and Systems for Video Technology, vol. 13, no. 7, July 2003. CABAC involves three main functions, namely, binarization, context modeling, and arithmetic coding. Binarization refers to the function of mapping syntax elements to binary symbols (or "bins"). Binary symbols may also be referred to as "bin strings." Context modeling refers to the function of estimating the probability of the various bins. Arithmetic coding refers to the subsequent function of compressing the bins to bits, based on the estimated probability. Various devices and/or modules thereof, such as a binary arithmetic coder, may perform the function of arithmetic coding.

Several different binarization processes are used in HEVC, including unary (U), truncated unary (TU), kth-order Exp-Golomb (EGk), and fixed length (FL). Details of various binarization processes are described in V. Sze and M. Budagavi, "High throughput CABAC entropy coding in HEVC," IEEE Transactions on Circuits and Systems for Video Technology (TCSVT), vol. 22, no. 12, pp. 1778-1791, December 2012.

Each context (i.e., probability model) in CABAC is represented by a state. Each state (a) implicitly represents a probability ($p_\sigma$) of a particular symbol (e.g., a bin) being the Least Probable Symbol (LPS). A symbol can be an LPS or a Most Probable Symbol (MPS). Symbols are binary, and as such, the MPS and the LPS can be 0 or 1. The probability is estimated for the corresponding context and used (implicitly) to entropy code the symbol using the arithmetic coder.

The process of BAC is handled by a state machine that changes its internal values 'range' and 'low' depending on the context to code and the value of the bin being coded. Depending on the state of a context (that is, its probability), the range is divided into rangeMPS$_\sigma$ (range of the most probable symbol in state$_\sigma$) and rangeLPS$_\sigma$ (range of the least probable symbol in state). In theory, the rangeLPS$_\sigma$ value of a probability state$_\sigma$ is derived by a multiplication:

$$\text{rangeLPS}_\sigma = \text{range} \times p_\sigma,$$

where $p_\sigma$ is the probability to select the LPS. Of course, the probability of MPS is $1-p_\sigma$. Equivalently, the rangeMPS$_\sigma$ is equal to range minus rangeLPS$_\sigma$. BAC iteratively updates the range depending on the state of the context bin to code, the current range, and the value of the bin being coded (i.e., is the bin equal to the LPS or the MPS).

Figure 2A:
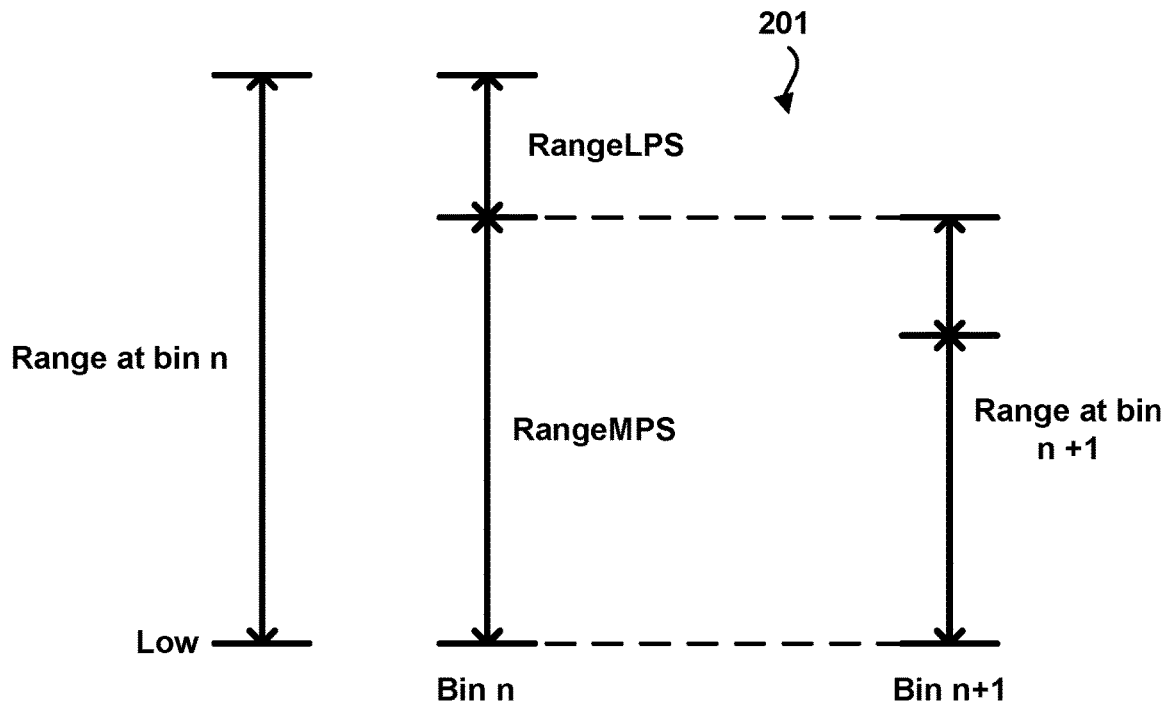
FIGS. 2A and 2B are conceptual diagrams illustrating a range update process in binary arithmetic coding.
Figure 2B:
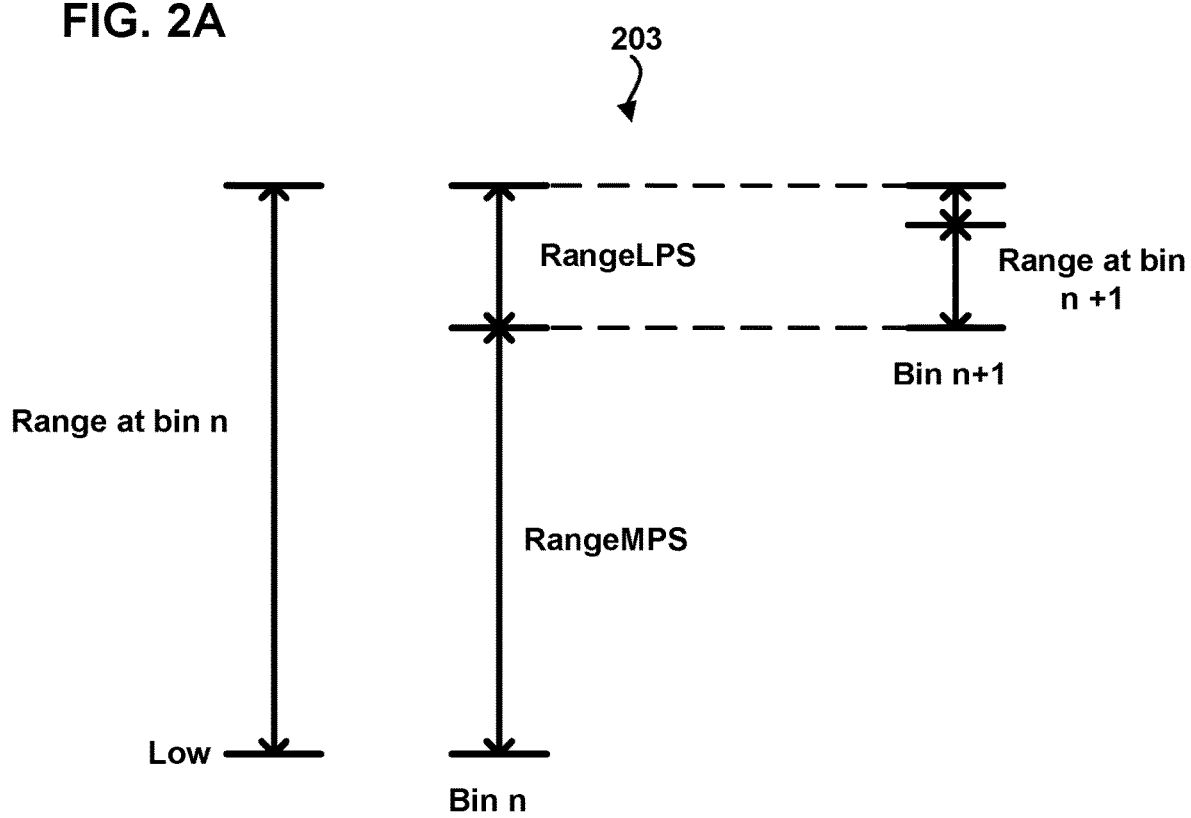

FIGS. 2A and 2B show examples of this process at bin n. In example 201 of FIG. 2A, the range at bin n includes the RangeMPS and RangeLPS given by the probability of the LPS ($p_\sigma$) given a certain context state ($\sigma$). Example 201 shows the update of the range at bin n+1 when the value of bin n is equal to the MPS. In this example, the low stays the same, but the value of the range at bin n+1 is reduced to the value of RangeMPS at bin n. Example 203 of FIG. 2B shows the update of the range at bin n+1 when the value of bin n is not equal to the MPS (i.e., equal to the LPS). In this example, the low is moved to the lower range value of RangeLPS at bin n. In addition, the value of the range at bin n+1 is reduced to the value of RangeLPS at bin n.

Figure 3:
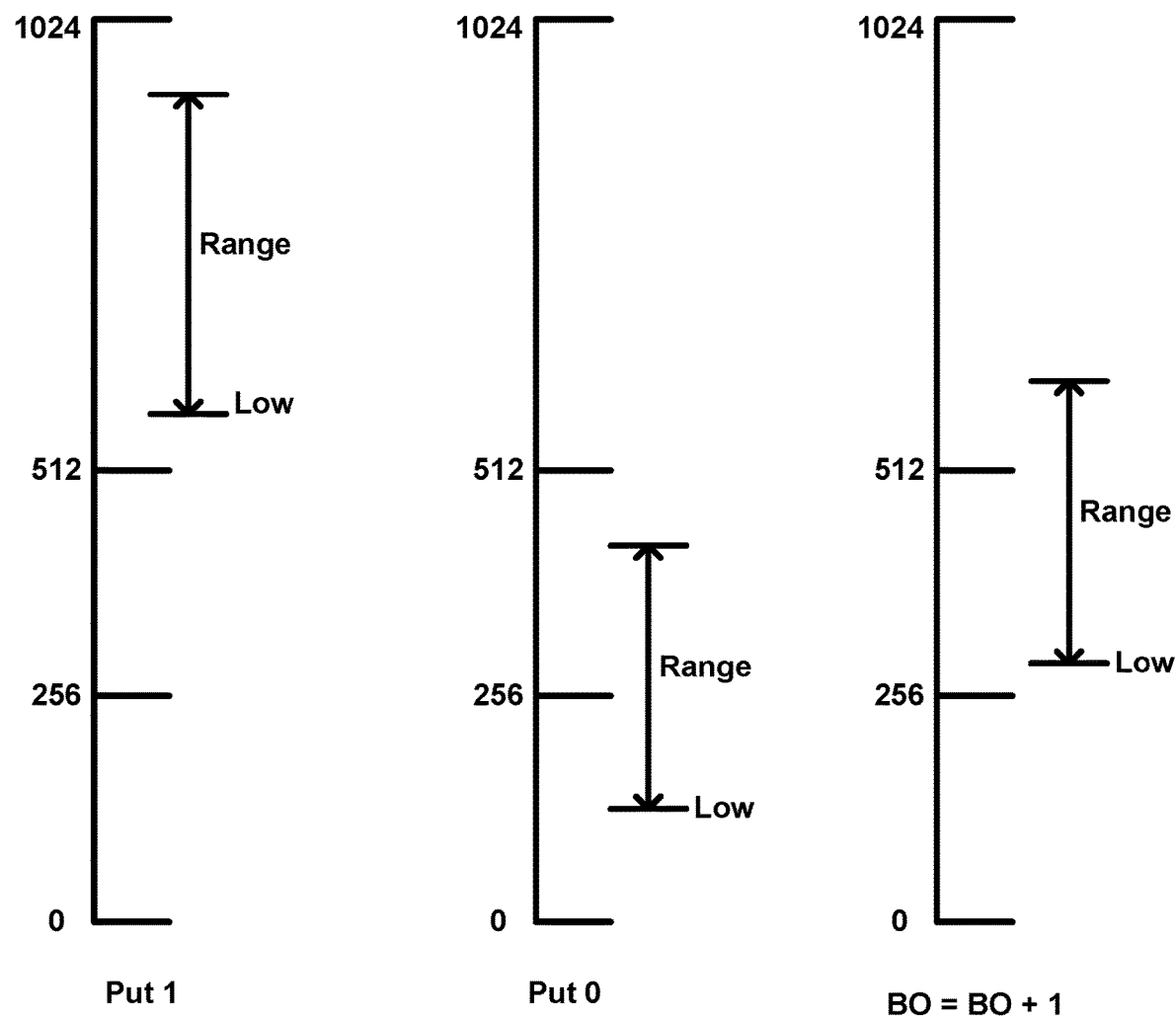
FIG. 3 is a conceptual diagram illustrating an output process in binary arithmetic coding.

In HEVC, the range is expressed with 9 bits and the low with 10 bits. There is a renormalization process to maintain the range and low values at sufficient precision. The renormalization occurs whenever the range is less than 256. Therefore, the range is always equal or larger than 256 after renormalization. Depending on the values of range and low, the BAC outputs to the bitstream, a '0,' or a '1,' or updates an internal variable (called BO: bits-outstanding) to keep for future outputs. FIG. 3 shows examples of BAC output depending on the range. For example, a '1' is output to the bitstream when the range and low are above a certain threshold (e.g., 512). A '0' is output to the bitstream when the range and low are below a certain threshold (e.g., 512). Nothing is output to the bitstream when the range and lower are between certain thresholds. Instead, the BO value is incremented and the next bin is encoded.

The techniques described in this disclosure may be performed, for example, within a video encoder, video decoder, or combined video encoder-decoder (CODEC). In particular, such techniques may be performed in an entropy encoding unit of a video encoder and/or an entropy decoding unit of a video decoder. The techniques may be performed, for example, within a CABAC process, which may be configured to support video coding, such as video coding according to aspects of the HEVC standard Entropy encoding and decoding units may apply coding processes in a reciprocal or inverse manner, e.g., to encode or decode any of a variety of video data, such as quantized transform coefficients associated with residual video data, motion vector information, syntax elements, and other types of information that may be useful in a video encoding and/or video decoding process.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and/or video decoder 300 may obtain a pre-defined slope index (e.g., SlopeIdx) and a pre-defined offset index (e.g., OffsetIdx) for a context of a plurality of contexts used in a context-adaptive entropy coding process to entropy code a value for a syntax element in a slice of the video data; determine, based on the pre-defined slope index and the pre-defined offset index, an initial probability state of the context for the slice of the video data in the linear domain; and entropy code, based on the initial probability state of the context, a bin of the value for the syntax element.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

The techniques of this disclosure are suitable for the binary arithmetic coders where the probability state represents the real probability in the linear domain, such as the Context Adaptive Binary Arithmetic Coder (CABAC) adopted in Versatile Video Coding (VVC).

In binary arithmetic coding, a video sequence is first converted into data elements (or syntax elements) with spatial-temporal redundancy removed; the syntax elements are then losslessly converted into binary representations (or bitstreams) by entropy coding. Recent video coding standards (e.g., HEVC and VVC) may utilize binary arithmetic coding to perform entropy coding.

The binary arithmetic coding process has three main stages, i.e., binarization, adaptive probability estimation, and arithmetic coding. In the binarization stage, each non-binary syntax element to be coded is converted into a string of binary data symbols (or bins).

In the adaptive probability estimation stage, each bin, no matter whether it is a binary syntax element or one element of the binary string converted from a non-binary syntax element, has an estimate of its probability distribution (i.e., the probability of being 0 or 1). The distributions may be classified into two categories: (1) stationary and uniform distribution (i.e., always p=0.5) and (2) time-varying or non-uniform distribution. The bin with Category (2) distribution may be assigned a probability model (or context model) tracking that bin's real-time distribution based on its previous bin values and other context statistics.

In the arithmetic coding stage, the bin with Category (1) distribution may be coded in the bypass mode, a low-complexity and highly parallelizable mode; the bin with Category (2) distribution is coded in regular mode, where the bin value and its probability estimated by the associated context model are used.

Figure 9:
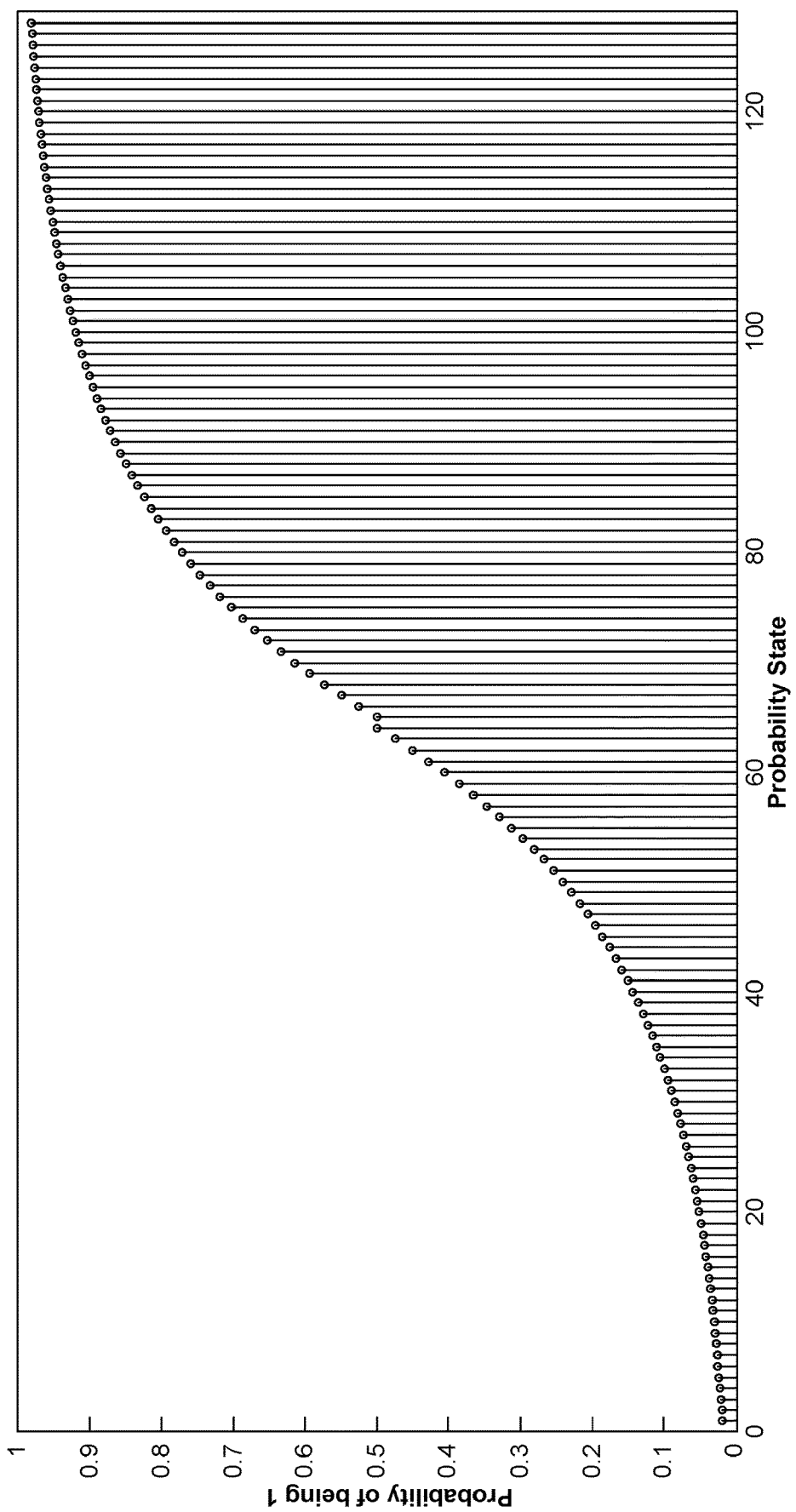
FIG. 9 is a graph illustrating the probability states to represent the probabilities of being 1, as in HEVC.
Figure 10A:
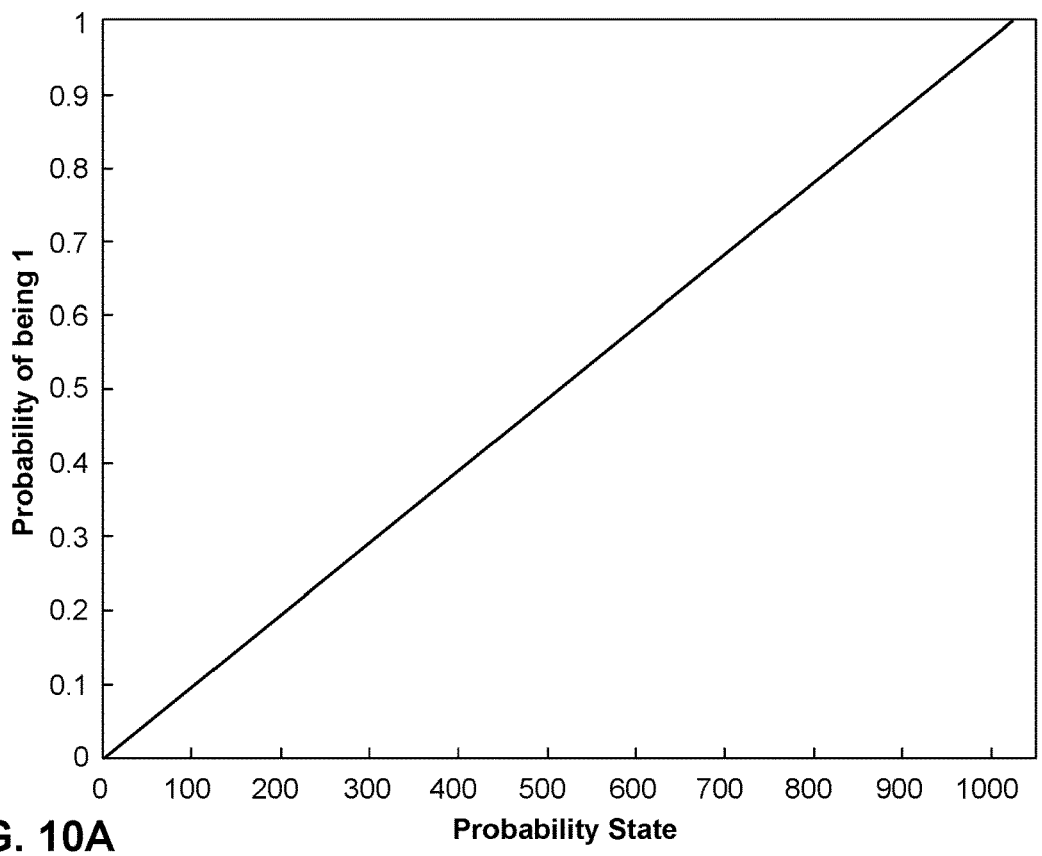
FIGS. 10A and 10B are graphs illustrating the probability states to represent the probabilities of being 1, as in VVC, with FIG. 10A having 1024 probability states (10-bit precision) and FIG. 10B having 16384 probability states (14-bit precision).
Figure 10B:
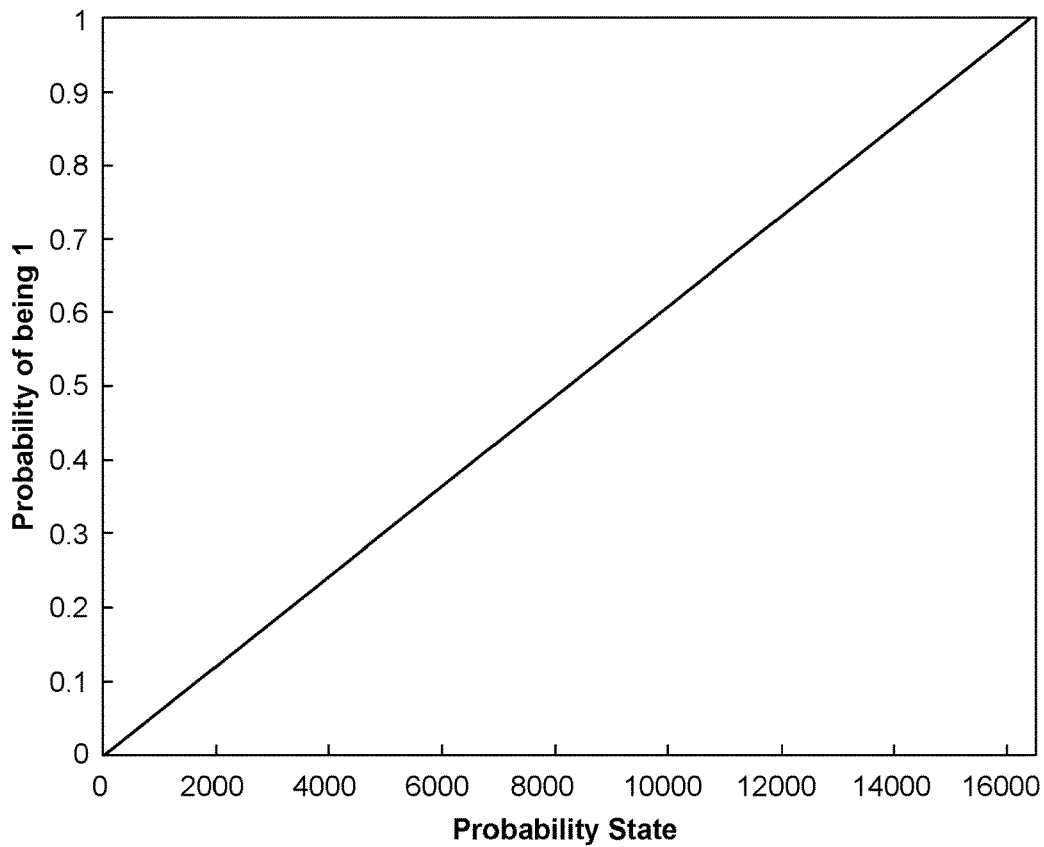

When used in binary arithmetic coders for video coding, the probability, theoretically real valued and ranging from 0 to 1, is digitized, and therefore is usually referred to as probability state. For example, in HEVC, the probability has 7-bit precision, corresponding to 128 probability states. FIG. 9 shows the mapping between probability and probability state. As can be seen, the probability state in HEVC represents the real probability in the logarithmic domain. For another example, in VVC, the probability estimate of a certain bin is the average of the two probabilities tracked in the bin's associated context model and updated at a rapid rate and a slow rate, respectively. The one updated at a rapid rate has 10-bit precision, corresponding to 1024 probability states; the other, updated at a slow rate, has 14-bit precision, corresponding to 16384 probability states. Unlike HEVC, VVC adopted the linear mapping between probability state and probability (see FIGS. 10A and 10B).

In HEVC and VVC, a video bitstream comprises or consists of multiple independently decodable units (e.g., slices), implying that at the beginning of such a unit, the probability states of all context models must be reset to some predefined values. Typically, without any prior knowledge of the statistical nature of the source, each context model should assume the uniform distribution (p=0.5). However, to bridge the learning phase of the adaptive probability estimation and to enable a preadaptation at different coding conditions, it is found to be beneficial to provide some more appropriate initial probability state (initialization process) than equiprobable state for each probability model.

The CABAC in HEVC has a quantization-parameter (QP) dependent initialization process invoked at the beginning of each slice. Given the initial value of luma QP for the slice, $SliceQP_Y$, the initial probability state of a certain context model, denoted as InitProbState, is generated by Eqs. (1) to (3), $$m = SlopeIdx*5-45 \qquad (1)$$

$$n = (OffsetIdx<<3)-16 \qquad (2)$$

$$InitProbState = Clip3(1,127,((m*SliceQP_Y)>>4)+n) \qquad (3)$$

where SlopeIdx and OffsetIdx (both integers ranging from 0 to 15 inclusive) are the initialization parameters predefined and stored for each context model. Eq. (3) means that InitProb State is modeled by a linear function of $SliceQP_Y$, with the slope approximately m>>4 and the intersection n at $SliceQP_Y=0$. The mapping from SlopeIdx to slope and from OffsetIdx to intersection can be found in Tables 1 and 2, respectively.

TABLE 1

Mapping from SlopeIdx to slope

| SlopeIdx | 0 | 1 | 2 | 3 | 4 | 5 | 6 | 7 |
|---|---|---|---|---|---|---|---|---|
| slope | −2.81 | −2.50 | −2.19 | −1.88 | −1.56 | −1.25 | −0.94 | −0.63 |
| SlopeIdx | 8 | 9 | 10 | 11 | 12 | 13 | 14 | 15 |
| slope | −0.31 | 0 | 0.31 | 0.63 | 0.94 | 1.25 | 1.56 | 1.88 |

TABLE 2

Mapping from OffsetIdx to intersection

| OffsetIdx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| intersection | −16 | −8 | 0 | 8 | 16 | 24 | 32 | 40 | 48 | 56 | 64 | 72 | 80 | 88 | 96 | 104 |

In other words, a context model may not store initial probability state directly; instead, it stores two initialization parameters jointly determining a linear function that, at the beginning of each slice, uses $SliceQP_Y$ as the argument to derive the probability state.

SlopeIdx and OffsetIdx, both having 4-bit precision, are packed into a single 8-bit initialization value, of which the high and the low nibble is SlopeIdx and OffsetIdx, respectively.

Figure 11A:
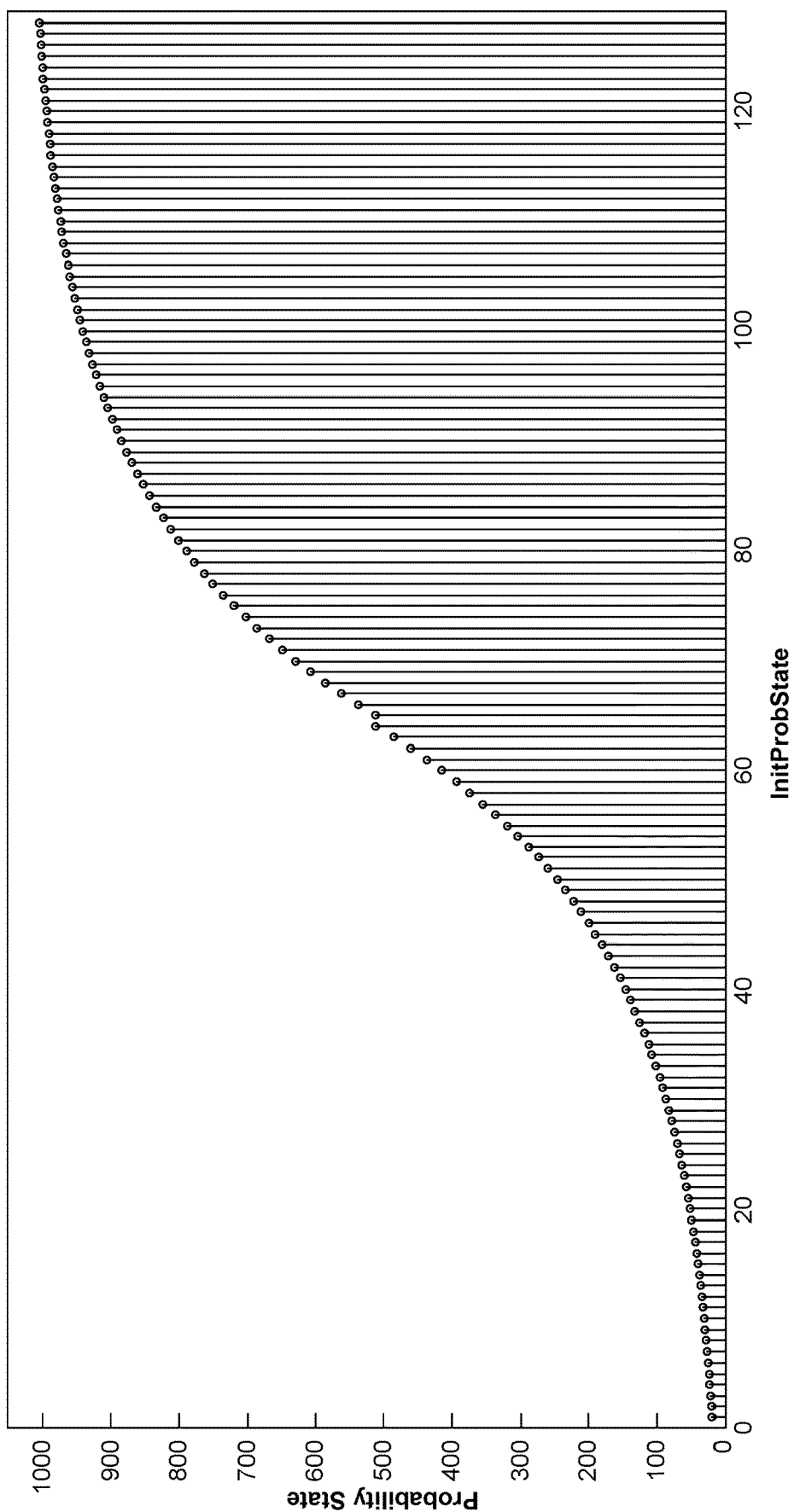
FIGS. 11A and 11B are graphs illustrating a mapping from InitProbState to probability state that can be used in the arithmetic coding engine of Versatile Video Coding (VVC), with FIG. 11A having 1024 probability states (10-bit precision) and FIG. 11B having 16384 probability states (14-bit precision).
Figure 11B:
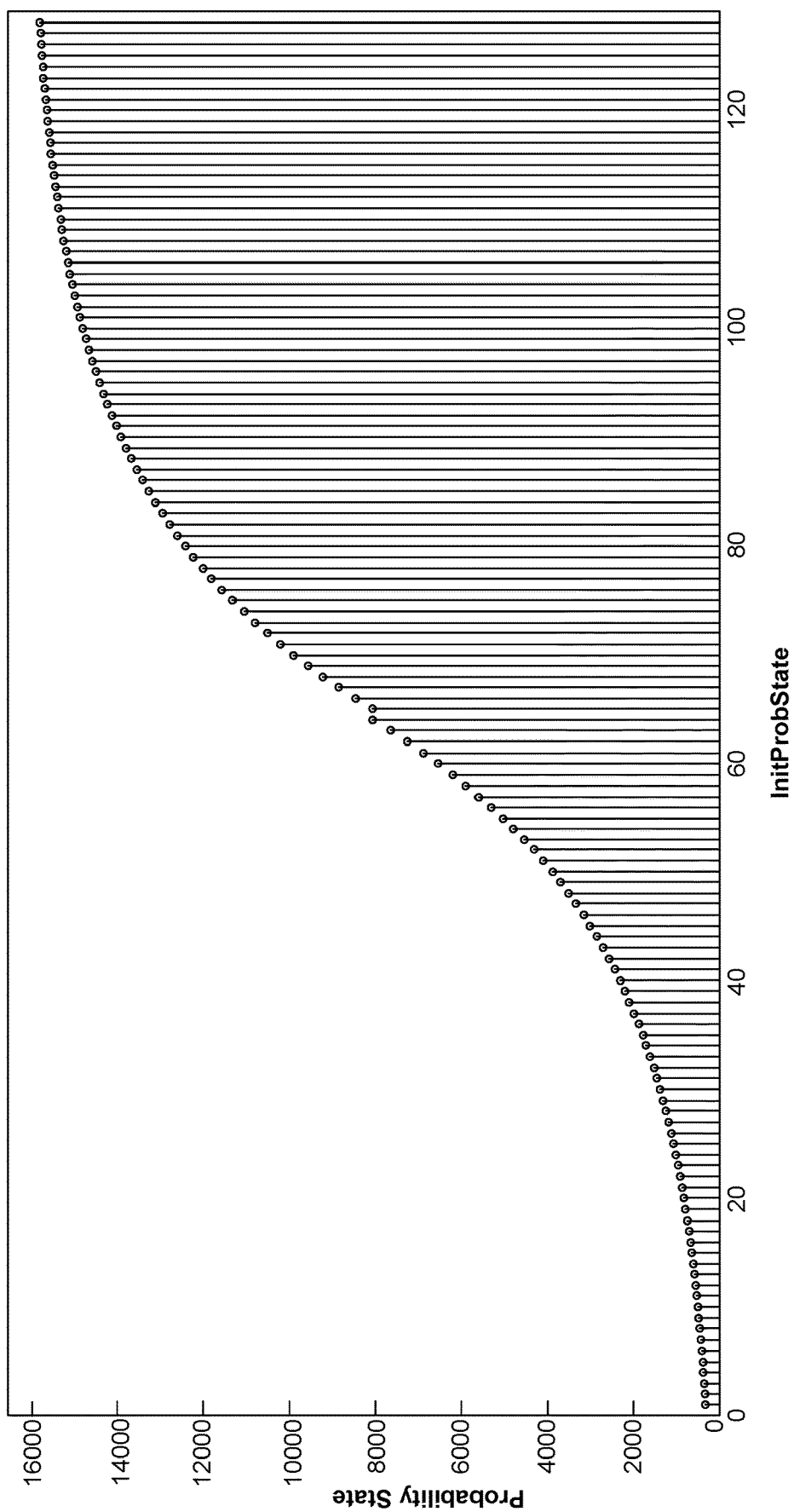

The CABAC of the current VVC uses basically the same way to derive InitProbState as in HEVC, except that in Eq. (3) the clipping is from 0 to 127. However, after deriving InitProb State, which represents the probability in the logarithmic domain (see FIG. 9), the initialization process in VVC needs one more step to convert InitProb State to a probability state that represents the probability in the linear domain (see FIGS. 10A and 10B), in order to be used in the arithmetic coding engine of VVC. The conversion (or mapping), shown in FIGS. 11A and 11B, is implemented by using a look-up table (LUT) (see Table 3), as below:

1. Use InitProb State as the search index to find the corresponding probability state value in the LUT.
2. The probability state in lower precision (10-bit), denoted as ProbabilityStateL, is derived in Eq. (4).

$$ProbabilityStateL = probability\_state >> 5 \quad (4)$$

The probability state in higher precision (14-bit), denoted as ProbabilityStateH, is derived in Eq. (5).

$$ProbabilityStateH = probability\_state >> 1 \quad (5)$$

TABLE 3

Mapping from InitProb State to probability_state

| InitProb State | 0 | 1 | 2 | 3 | 4 | 5 | 6 | 7 |
|---|---|---|---|---|---|---|---|---|
| probability_state | 614 | 647 | 681 | 718 | 756 | 797 | 839 | 884 |
| InitProb State | 8 | 9 | 10 | 11 | 12 | 13 | 14 | 15 |
| probability_state | 932 | 982 | 1034 | 1089 | 1148 | 1209 | 1274 | 1342 |
| InitProb State | 16 | 17 | 18 | 19 | 20 | 21 | 22 | 23 |
| probability_state | 1414 | 1490 | 1569 | 1653 | 1742 | 1835 | 1933 | 2037 |
| InitProb State | 24 | 25 | 26 | 27 | 28 | 29 | 30 | 31 |
| probability_state | 2146 | 2261 | 2382 | 2509 | 2643 | 2785 | 2934 | 3091 |
| InitProb State | 32 | 33 | 34 | 35 | 36 | 37 | 38 | 39 |
| probability_state | 3256 | 3430 | 3614 | 3807 | 4011 | 4225 | 4452 | 4690 |
| InitProb State | 40 | 41 | 42 | 43 | 44 | 45 | 46 | 47 |
| probability_state | 4941 | 5205 | 5483 | 5777 | 6086 | 6412 | 6755 | 7116 |
| InitProb State | 48 | 49 | 50 | 51 | 52 | 53 | 54 | 55 |
| probability_state | 7497 | 7898 | 8320 | 8766 | 9235 | 9729 | 10249 | 10798 |
| InitProb State | 56 | 57 | 58 | 59 | 60 | 61 | 62 | 63 |
| probability_state | 11375 | 11984 | 12625 | 13300 | 14012 | 14762 | 15551 | 16384 |
| InitProb State | 64 | 65 | 66 | 67 | 68 | 69 | 70 | 71 |
| probability_state | 16384 | 17216 | 18005 | 18755 | 19467 | 20142 | 20783 | 21392 |
| InitProb State | 72 | 73 | 74 | 75 | 76 | 77 | 78 | 79 |
| probability_state/ | 21969 | 22518 | 23038 | 23532 | 24001 | 24447 | 24869 | 25270 |
| InitProb State | 80 | 81 | 82 | 83 | 84 | 85 | 86 | 87 |
| probability_state | 25651 | 26012 | 26355 | 26681 | 26990 | 27284 | 27562 | 27826 |
| InitProb State | 88 | 89 | 90 | 91 | 92 | 93 | 94 | 95 |
| probability_state | 28077 | 28315 | 28542 | 28756 | 28960 | 29153 | 29337 | 29511 |
| InitProb State | 96 | 97 | 98 | 99 | 100 | 101 | 102 | 103 |
| probability_state | 29676 | 29833 | 29982 | 30124 | 30258 | 30385 | 30506 | 30621 |
| InitProb State | 104 | 105 | 106 | 107 | 108 | 109 | 110 | 111 |
| probability_state | 30730 | 30834 | 30932 | 31025 | 31114 | 31198 | 31277 | 31353 |
| InitProb State | 112 | 113 | 114 | 115 | 116 | 117 | 118 | 119 |
| probability_state | 31425 | 31493 | 31558 | 31619 | 31678 | 31733 | 31785 | 31835 |
| InitProb State | 120 | 121 | 122 | 123 | 124 | 125 | 126 | 127 |
| probability_state | 31883 | 31928 | 31970 | 32011 | 32049 | 32086 | 32120 | 32153 |

As discussed above, the CABAC of the current VVC adopts the probability states presenting the probabilities in the linear domain (see FIGS. 10A and 10B), but still uses the legacy initialization process in HEVC, of which the derived initial probability states represent the probabilities in the logarithmic domain. To bridge the output of initialization process and the input of the arithmetic coding engine, a 128-entry LUT is used for mapping.

In accordance with one or more techniques of this disclosure, the initialization process may be modified for VVC (e.g., these techniques may improve this table look-up process by properly modifying the initialization process in VVC). Two methods are proposed for the modification. In one method, the output probability state InitProb State represents the probability in the linear domain. By doing this, the mapping process is reduced to shifting operations, only for precision adjustment purpose. In the other method, the output probability state InitProb State represents the probability in the quadratic domain, and the mapping is realized by using equations, not LUT.

Figure 12:
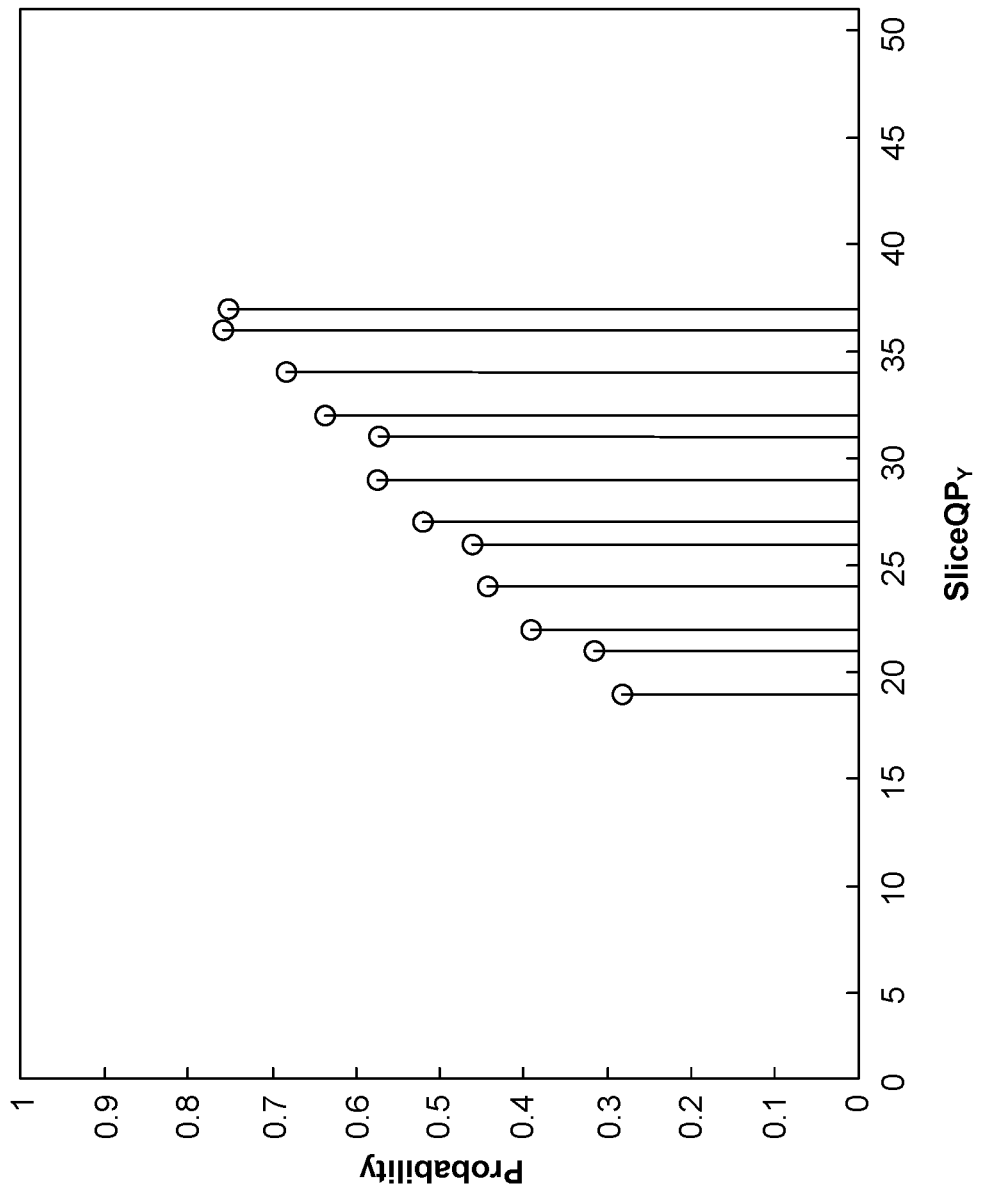
FIG. 12 is a graph illustrating prior knowledge of the probability distribution of syntax element SaoMergeFlag (1 bin) used in I slice.

Increase the range of slope and intersection. To find the appropriate initialization parameters for a given context model, one needs to acquire the prior knowledge of the probability distribution of the bins that use that context model, by some means, such as statistical analysis of the source. FIG. 12 shows an example for the bin of syntax element SaoMergeFlag used in I slice.

Figure 13A:
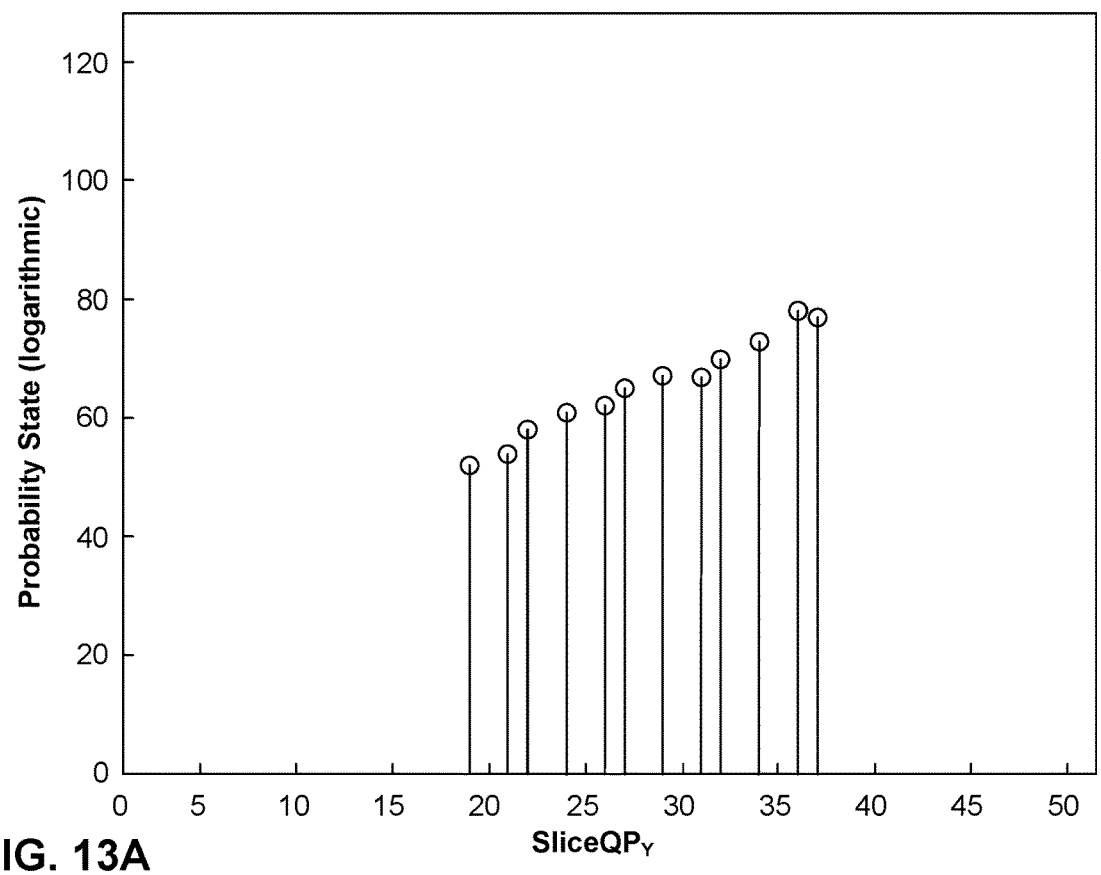
FIG. 13A is a graph illustrating prior knowledge of probability distribution in FIG. 12 represented by probability state in logarithmic domain.
Figure 13B:
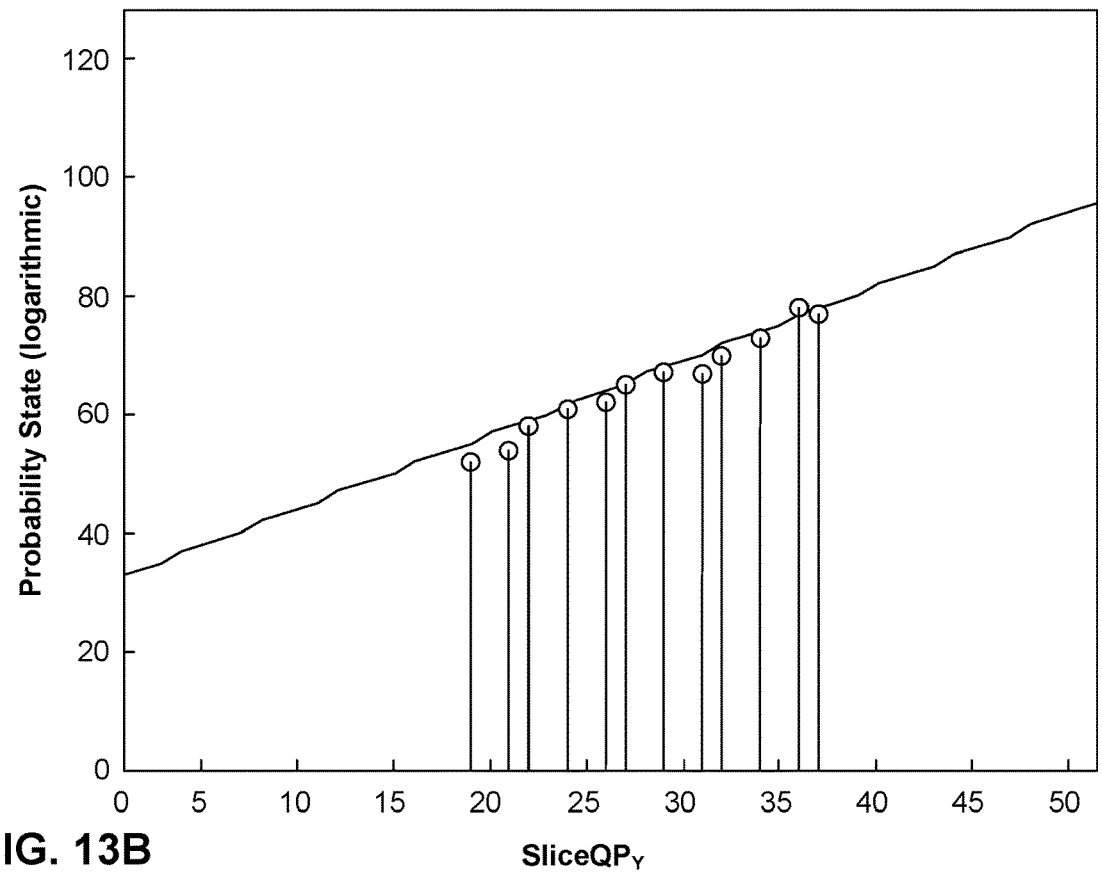
FIG. 13B is a graph illustrating model probability state and SliceQP$_Y$ with a linear function.

In HEVC and the current VVC, the prior knowledge of probability is converted into probability state in the logarithmic domain (FIG. 13A is converted from FIG. 12), and the optimal initialization parameters, by which the determined linear function best fits the correlation between probability state and $SliceQP_Y$, are found by brute-force search or some other smarter ways. For the same example, SlopeIdx and OffsetIdx are 13 and 6, respectively (slope approximately 1.25 and intersection 32), and the corresponding best fitting linear function is plotted in FIG. 13B.

Figure 14A:
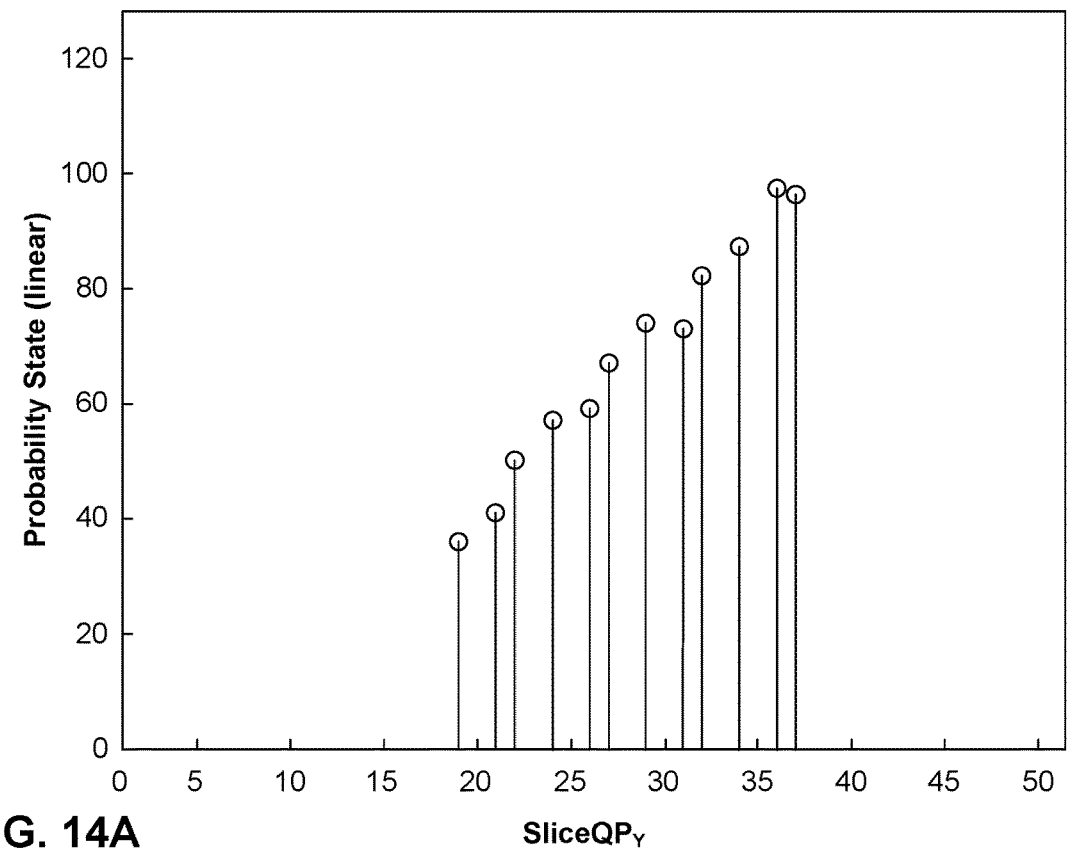
FIG. 14A is a graph illustrating prior knowledge of probability distribution in FIG. 12 represented by probability state in linear domain.

In accordance with the techniques of this disclosure, the initial probability state is in the linear domain, to be harmonized with the arithmetic coding engine. For the same example, the prior knowledge represented by probability state in the linear domain is shown in FIG. 14A, which is simply a scaled version of FIG. 12. Note that 7-bit precision is used for both logarithm and linear probability states, for the simplicity of clarification. However, in other examples, other bit precisions may be used.

Figure 14B:
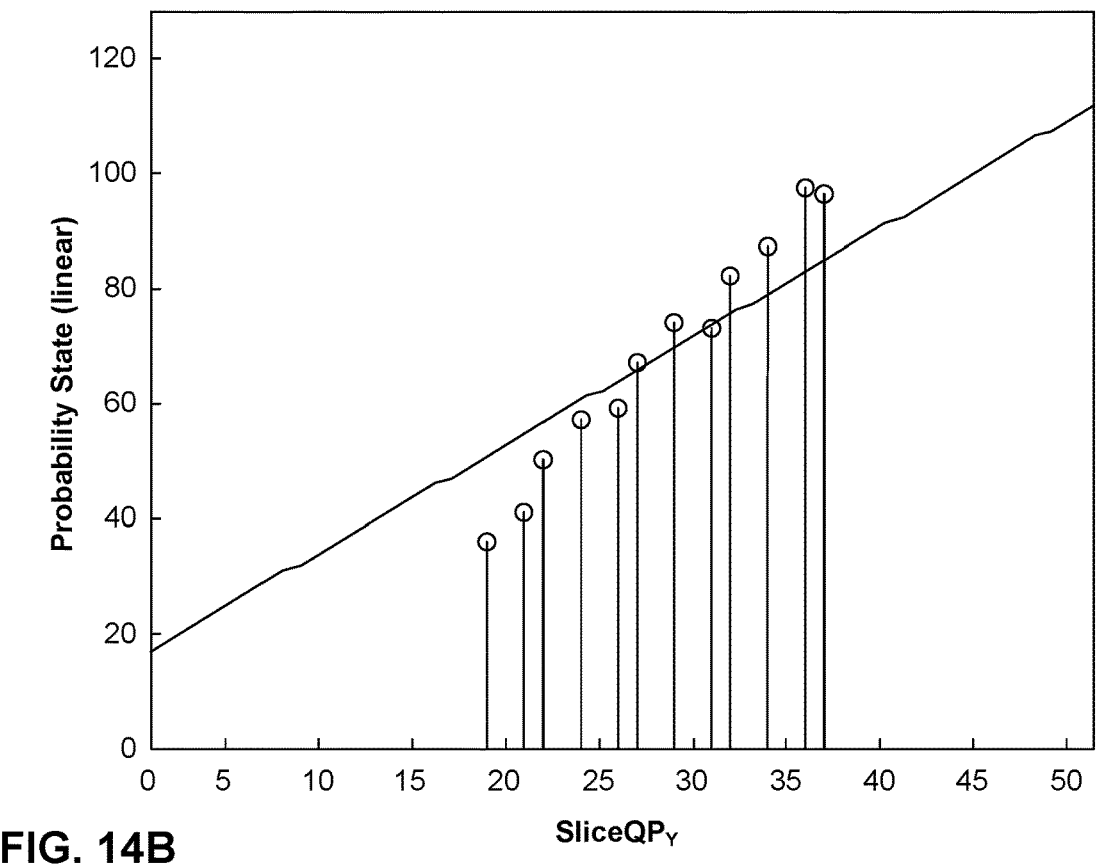
FIG. 14B is a graph illustrating model probability state and SliceQP$_Y$ with a linear function without increasing the ranges of slope and offset defined in HEVC and the current VVC.
Figure 14C:
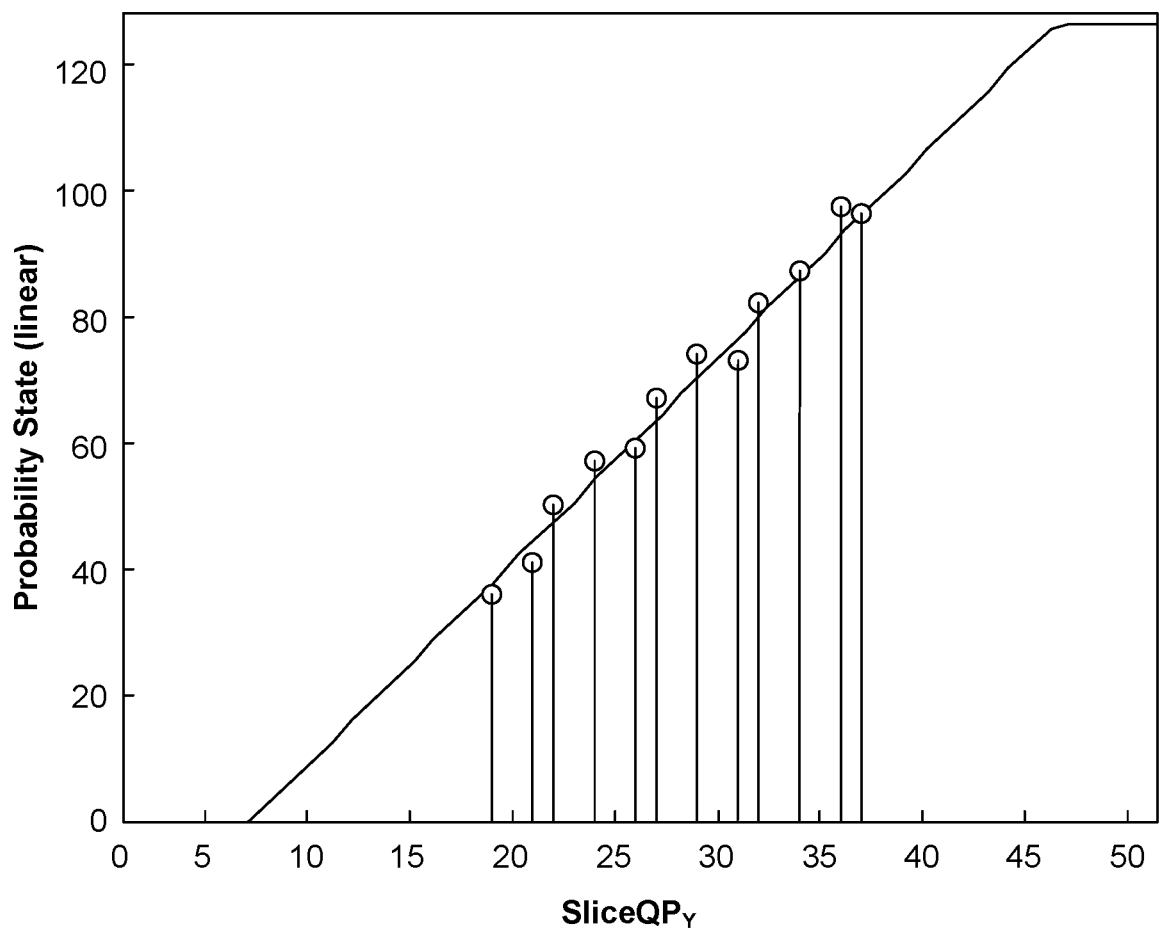
FIG. 14C is a graph illustrating a model probability state and SliceQP$_Y$ with a linear function with increased ranges of slope and offset.

A comparison of FIG. 13A and FIG. 14A shows that the probability state changes much more mildly along with $SliceQP_Y$ in the logarithmic domain than it does in the linear domain, which means a flat line well fitting the probability states in the logarithmic domain may become quite steep in the linear domain. Regarding the probability state shown in FIG. 14A, without changing the initialization process defined in HEVC and the current VVC (see Eqs. (1) to (3)), the best initialization parameters one can find by brute-force search are SlopeIdx equal to 15 and OffsetIdx equal to 4, with which the largest valid slope 1.88 is reached, as shown in FIG. 14B. However, the line may not yet be steep enough to achieve a good fitting. With increased search ranges of slope and intersection, a better fitting may be found, as shown in FIG. 14C, where slope is 3.25 and the intersection is −23, both exceed the limits that HEVC and the current VVC allow.

Note that the example (FIGS. 12 to 14C) is typical rather than exceptional—a good number of bins has such kind of probability distributions. Therefore, the ranges of slope and offset should be increased in order to use a linear model to fit the correlation of $SliceQP_Y$ and probability state that is now in the linear domain.

In one example, the numbers of possible slope and intersection values do not change (i.e., SlopeIdx and OffsetIdx still range from 0 to 15), but the step size between them are increased, which means the constant a in Eq. (6) is larger than 5 in Eq. (1) and b in Eq. (7) is larger than 3 in Eq. (2), respectively.

$$m = SlopeIdx*a - c \quad (6)$$

$$n = (OffsetIdx << b) - d \quad (7)$$

In another example, the numbers of possible slope and intersection values are increased. For example, SlopeIdx can range from 0 to 31, leading to 32 possible slope values. The above two examples may be jointly used, or may be used independently.

Figure 15A:
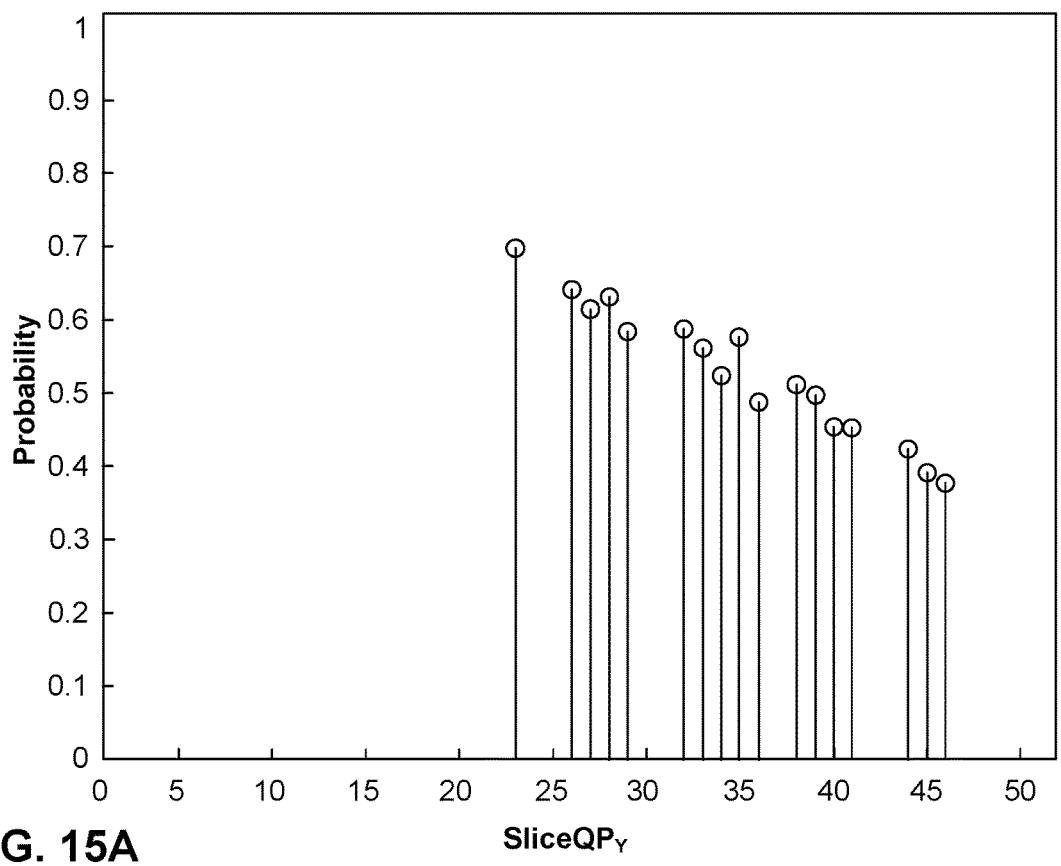
FIG. 15A is a graph illustrating prior knowledge of the probability distribution of syntax element SplitFlag used in B slice.
Figure 15B:
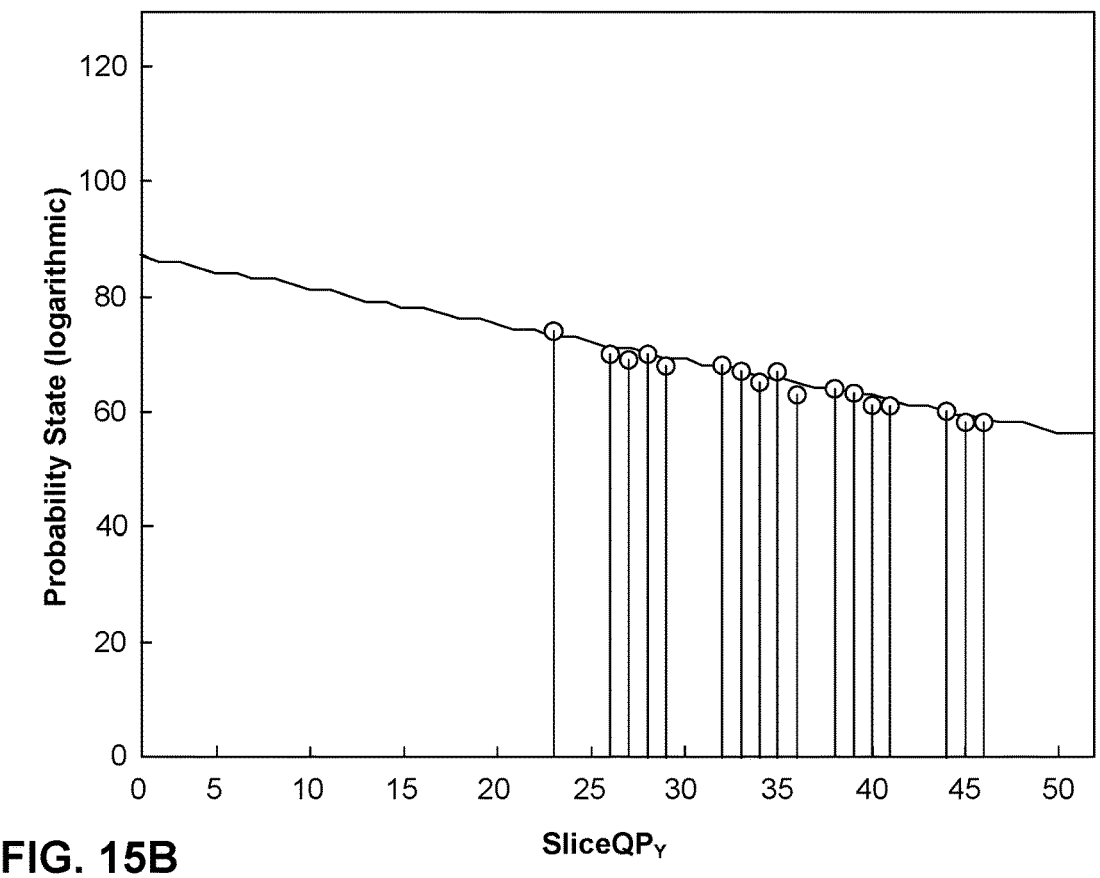
FIG. 15B is a graph illustrating model logarithmic probability state and SliceQP$_Y$ with a linear function.
Figure 15C:
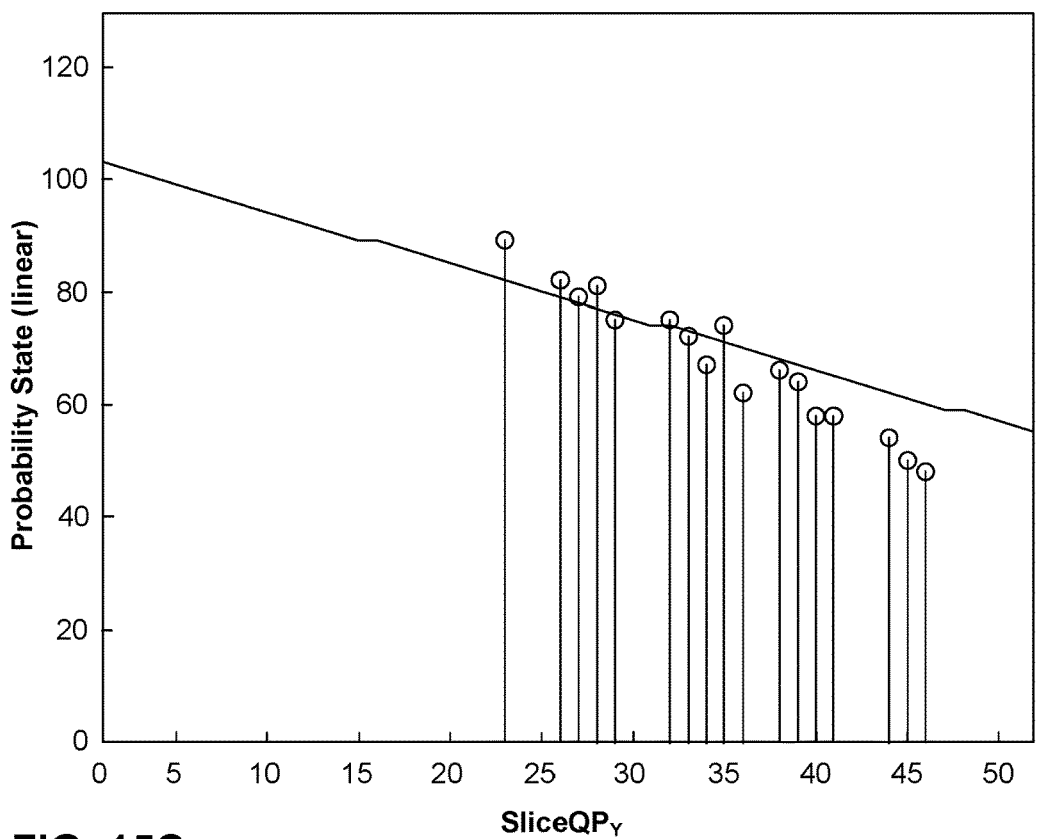
FIG. 15C is a graph illustrating model linear probability state and SliceQP$_Y$ with a linear function using the slopes and offsets defined in HEVC and the current VVC.
Figure 15D:
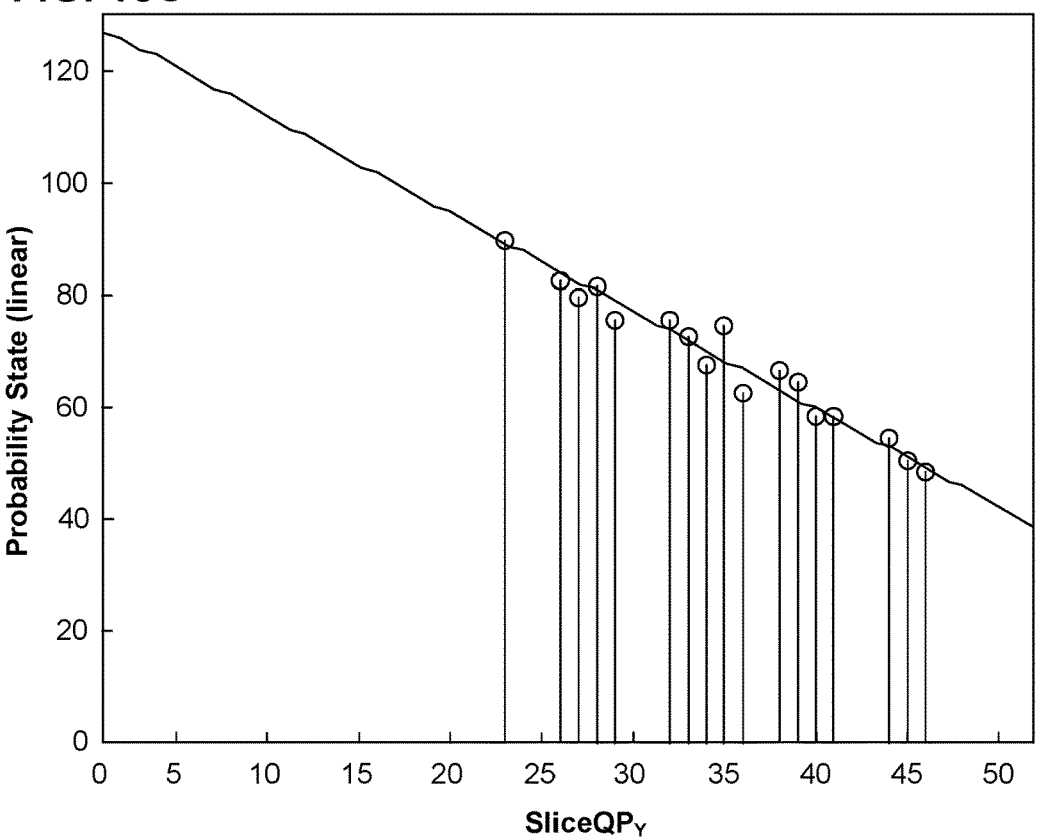
FIG. 15D is a graph illustrating model linear probability state and SliceQP$_Y$ with a linear function with intersection defined at SliceQP$_Y$ equal to 32.

Define Intersection at $SliceQP_Y$ not Equal to 0. Besides catering to the linear probability state with increased ranges of slope and offset, defining intersection at $SliceQP_Y$ not equal to 0 is an alternative or additional way. For example, FIG. 15A shows the probability distribution of SplitFlag used in B slice. In the logarithmic domain, as shown in FIG. 15B, the probability state with respect to $SliceQP_Y$ can be modeled well by a linear function with slope equal to −0.63 and intersection equal to 88 (i.e., SlopeIdx 7 and OffsetIdx 13 as defined in HEVC and the current VVC). However, in the linear domain, the probability state cannot be modeled well by the valid slope/intersection combinations defined in HEVC and the current VVC. FIG. 15C shows the closest fitting found by brute-force search, where slope equals −0.94 and intersection equals 104 (i.e., SlopeIdx 6 and OffsetIdx 15). As shown in FIG. 15D, another valid slope −1.88 (SlopeIdx 3) does achieve better fitting, but the projection to they axis (i.e., the intersection at $SliceQP_Y$ equal to 0) is 130, far beyond the upper limit of 104.

As shown above in Eq. (3), in some examples, the initial probability state may be determined in part by multiplying the variable m by $SliceQP_Y$. In the example of Eq. (3), the linear model of the probability state is defined at the point where $SliceQP_Y$ is zero.

In accordance with one or more techniques of this disclosure, a video coder may utilize an offset such that the linear model of the probability state is defined at a value of $SliceQP_Y$ other than zero. The point on the linear model at which the probability state is defined may be referred to as a quantization parameter anchor point ($QP_{anchor}$). For instance, the video coder may subtract the offset from $SliceQP_Y$, and multiply the result by the variable m. In one example, this may be accomplished by modifying Eq. (3) into Eq. (8) as shown below.

$$InitProbState = Clip3(1, 127, ((m*(SliceQP_Y - QP_{anchor})) >> 4) + n) \quad (8)$$

where $QP_{anchor}$ is the QP value at which the intersection is defined. In this way, the intersection may not exceed the valid range of the probability states (1 to 127 in this example), and the consideration of a large projection at y axis is eliminated, especially when the slope is steep. In FIG. 15D, SlopeIdx equals 3, $QP_{anchor}$ is 32, and the intersection at $QP_{anchor}$ is 72. Other values for $QP_{anchor}$ include, but are not limited to, 8, 16, 64, 128, etc.

Use Alternative Representation for Linear Function. In the examples discussed above, the linear function used to model probability state with $SliceQP_Y$ is determined by pair of slope and intersection, which is the same as HEVC and the current VVC. This section proposes alternative representations for linear functions, where a line function is determined by two intersections at two different QPs. Compared with slope/intersection representation, this double-intersection representation provides more flexibility in fitting, because it allows many more slope values that are not in the form of arithmetic sequence.

Denote the two intersections and the two corresponding QPs as int1, int2, QP1, and QP2, respectively. QP1 and QP2 can be arbitrary, as long as they are within the valid range defined in the current VVC (0 to 63). However, since InitProbState is calculated by Eq. (9) or Eq. (10) as below (note that for the simplicity of clarification, intermediate clipping and shifting operations are not considered here), $$\frac{int1 - int2}{QP1 - QP2}(SliceQP_Y - QP1) + int1 \quad (9)$$

$$\frac{int1 - int2}{QP1 - QP2}(SliceQP_Y - QP2) + int2 \quad (10)$$

the difference of QP1 and QP2 is better to be an integer power of 2, so that the divisions in Eq. (9) and Eq. (10) can be replaced by right shifting.

Figure 16A:
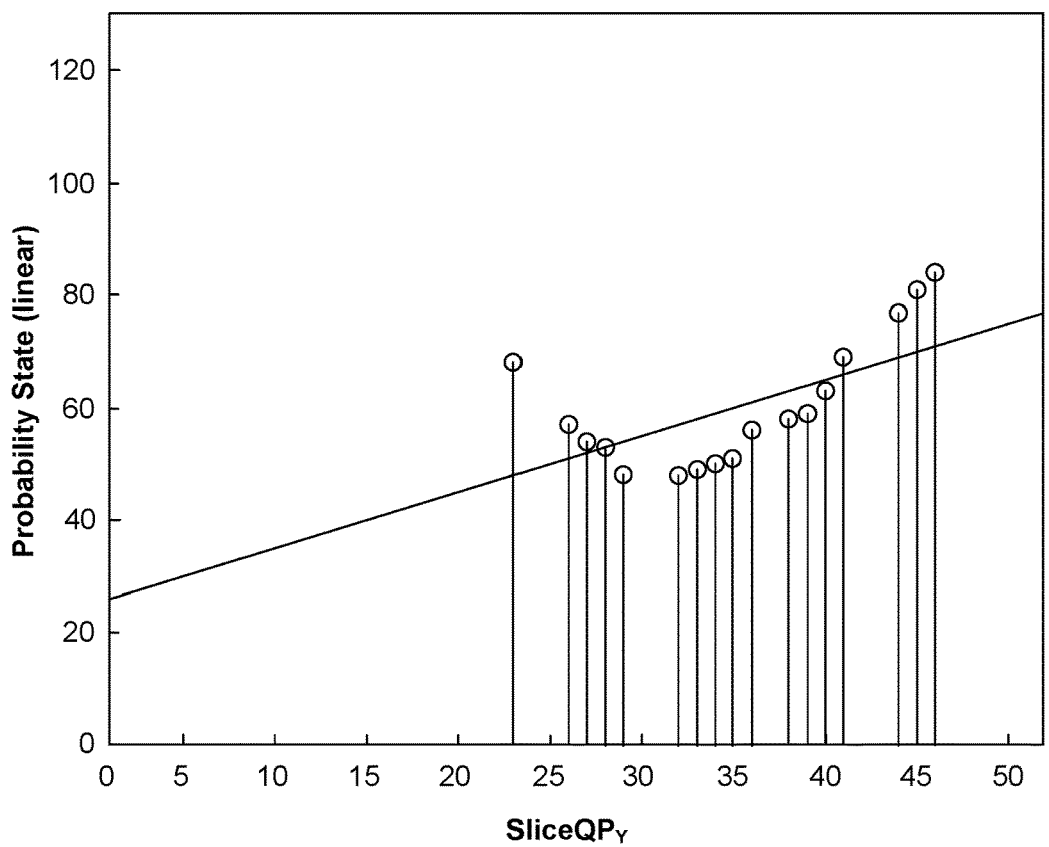
FIGS. 16A-16C are graphs illustrating the use of a piecewise linear function determined by multiple intersections to fit probability distributions.
Figure 16B:
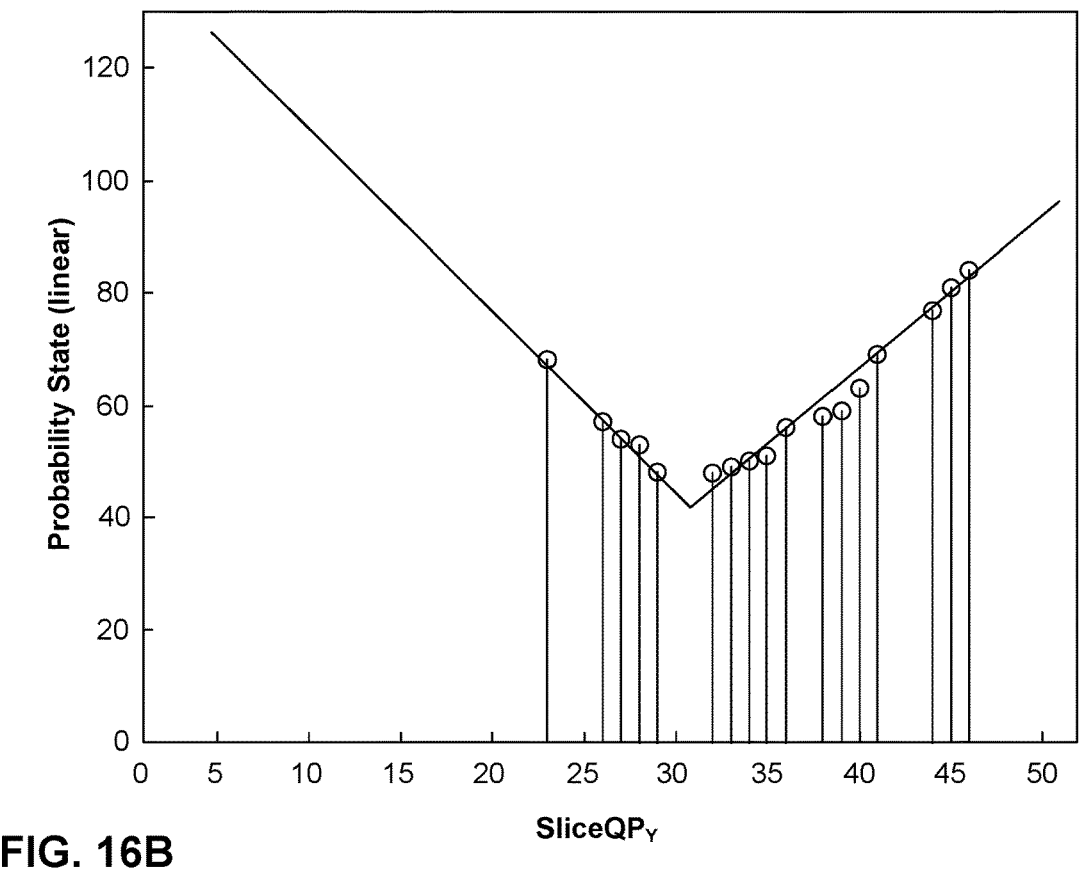
Figure 16C:
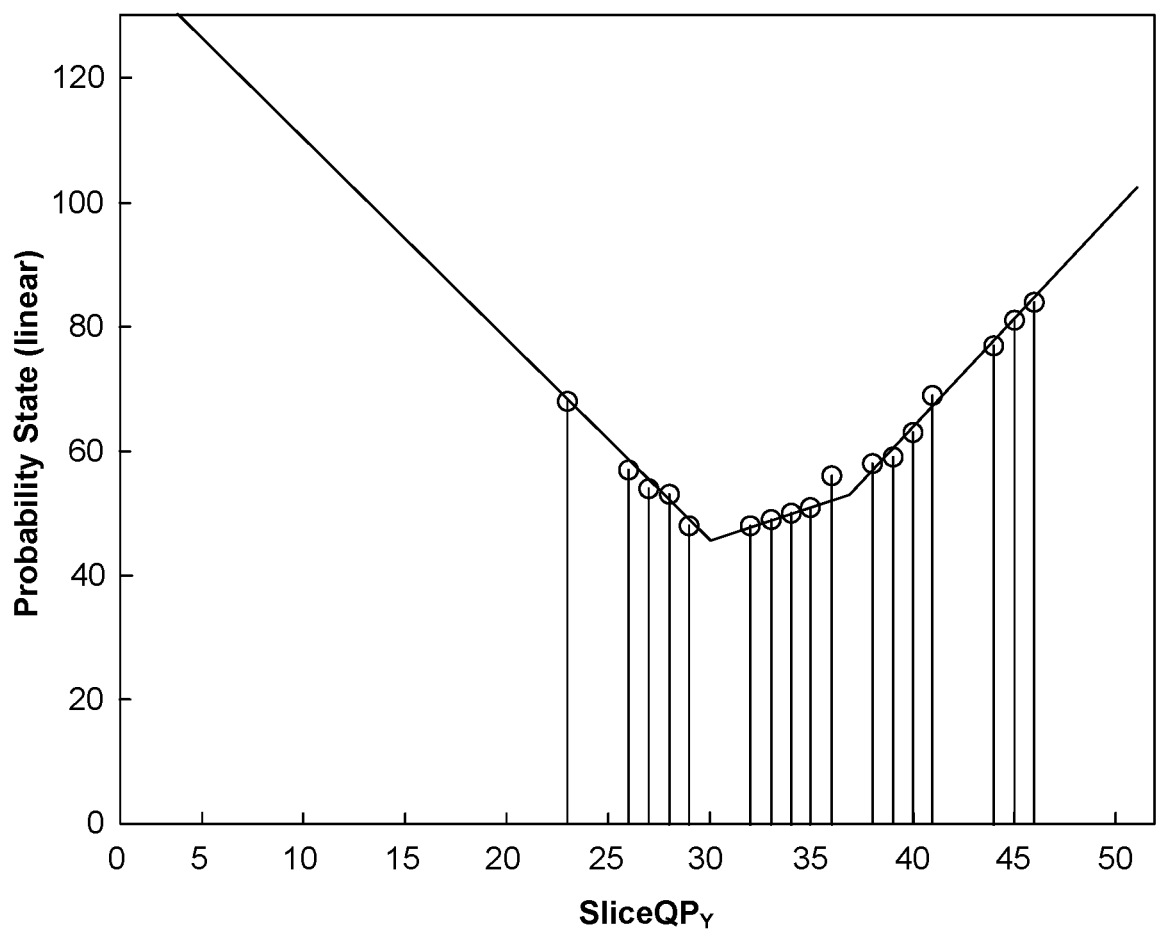

The double-intersection representation can be further extended to multiple-intersection representation determining piecewise linear functions. One such an example is a bin from luma SigFlag, see FIGS. 16A-16C, where a turning point occurs at QP around 30 or 31 and a straight line determined by slope/intersection pair or double intersections is not good enough for fitting (see FIG. 16A). In this case, triple-intersection representation is proposed, which uses three initialization parameters: intersection at QP equal to 31 and two other intersections at QP smaller and greater than 31, respectively (see FIG. 16B). To fit the probability distribution even more precisely, a quadruple-intersection representation may be used, where an additional initialization parameter representing the intersection at QP equal to 37 is used to capture another minor turning point (see FIG. 16C).

Keep Higher Intermediate Precision. The above examples introduce the modifications on Eqs. (1) to (3), and derive InitProb State in the linear domain. InitProbState still has 7-bit precision (0 to 127), due to HEVC legacy, and needs to be left shifted 3 bits and 7 bits, in order to align with the precisions of ProbabilityStateL and ProbabilityStateH defined in the current VVC, as in Eqs. (11) and (12).

$$\text{ProbabilityState}L = \text{InitProbState} << 3 \quad (11)$$

$$\text{ProbabilityState}H = \text{InitProbState} << 7 \quad (12)$$

Note that the table look-up step right before Eqs. (4) and (5) is saved in this technique.

Applying right shifting to derive InitProbState (see Eq. (3)) followed by left shiftings (see Eqs. (11) and (12)) certainly loses more information than moving all (or part) of the right shiftings to the last step, because the latter preserves higher intermediate precision. The following two examples move all of the right shiftings to the last step.

In one example:

$$\text{InitProbState} = \text{Clip3}(1,2047,((m*\text{SliceQP}_Y)+(n<<4))) \quad (13)$$

$$\text{ProbabilityState}L = \text{InitProbState} >> 1 \quad (14)$$

$$\text{ProbabilityState}H = \text{InitProbState} << 3 \quad (15)$$

In another example:

$$\text{InitProbState} = \text{Clip3}(0,2047,((m*\text{SliceQP}_Y)+(n<<4))) \quad (16)$$

$$\text{ProbabilityState}L = \text{InitProbState} >> 1 \quad (17)$$

$$\text{ProbabilityState}H = (\text{InitProbState} << 3) + 4 \quad (18)$$

CE1-related: Simplification of JVET-O0191 using 4 or 6 bit per initialization value, JVET-O0946, Gothenburg, Sweden, Jul. 3-12, 2019 (hereinafter "WET-O0946") proposes the following technique for initialization:

$$q = \text{Clip3}(9,23,\text{SliceQP}_Y >> 1) - 8$$

$$a = (\text{initValue} >> 3) * 9$$

$$b = (\text{initValue} \& 7) * 9$$

$$\text{ProbabilityState}L = 16*a + (b-a)*q + 8$$

$$\text{ProbabilityState}H = \text{ProbabilityState}L << 4$$

However, the technique proposed in JVET-O0946 may present one or more disadvantages. For instance, the technique proposed in JVET-O0946 may lose some intermediate precision.

In accordance with one or more techniques of this disclosure, a video coder may perform the initialization as follows:

$$q = \text{Clip3}(18,46,\text{SliceQP}_Y) - 16$$

$$a = (\text{initValue} >> 3) * 9$$

$$b = (\text{initValue} \& 7) * 9$$

$$\text{ProbabilityState}L = 16*a + ((b-a)*q >> 1) + 8$$

$$\text{ProbabilityState}H = \text{ProbabilityState}L << 4$$

As can be seen above, by moving the right shift until the final step (i.e., calculating ProbabilityStateL), the above technique allows for high intermediate precision.

Figure 17A:
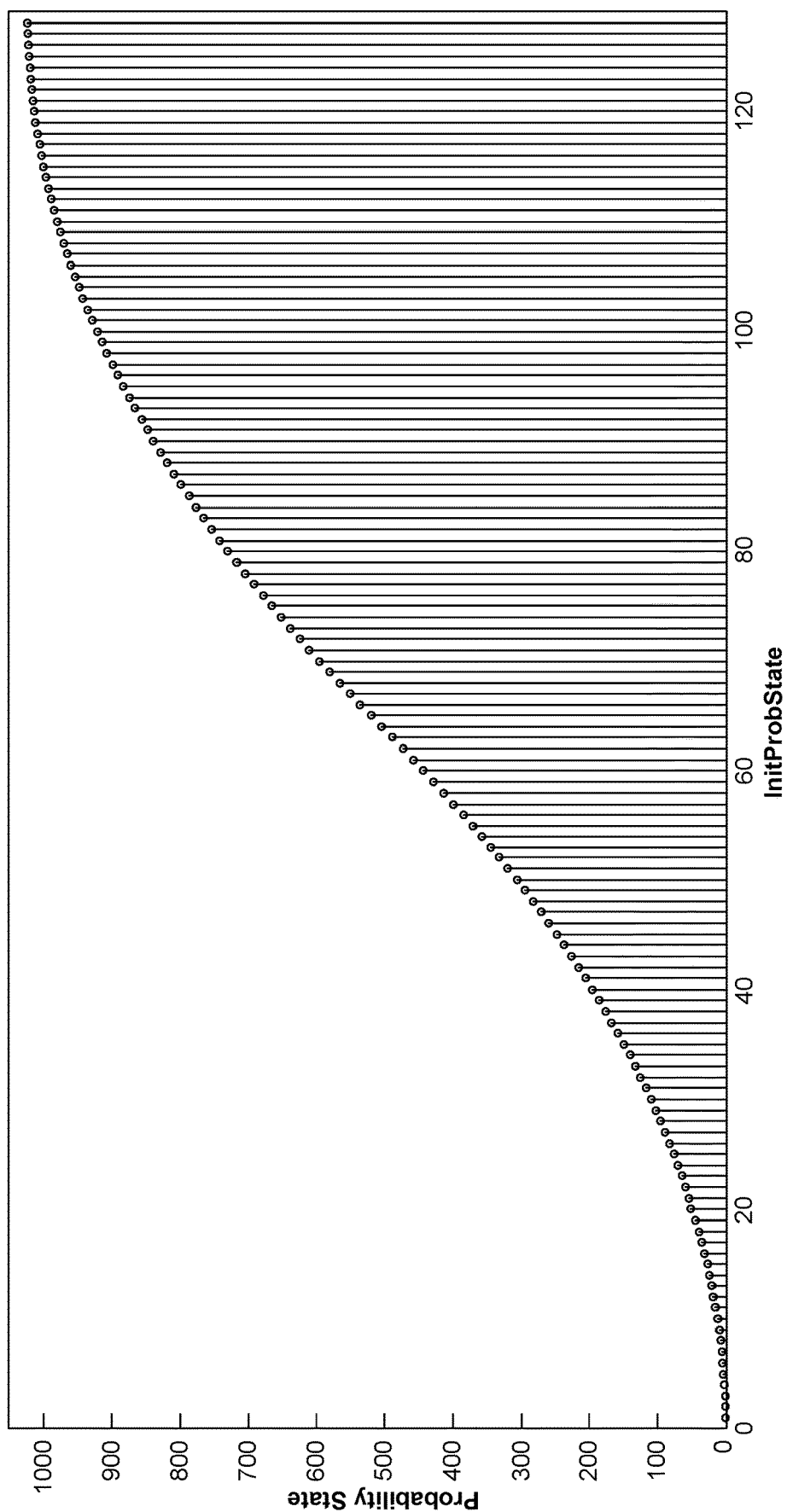
FIGS. 17A and 17B are graphs illustrating an example of mapping quadratic domain InitProb State to probability state that can be used in the arithmetic coding engine of VVC, with FIG. 17A having 1024 probability states (10-bit precision) and FIG. 17B having 16384 probability states (14-bit precision).
Figure 17B:
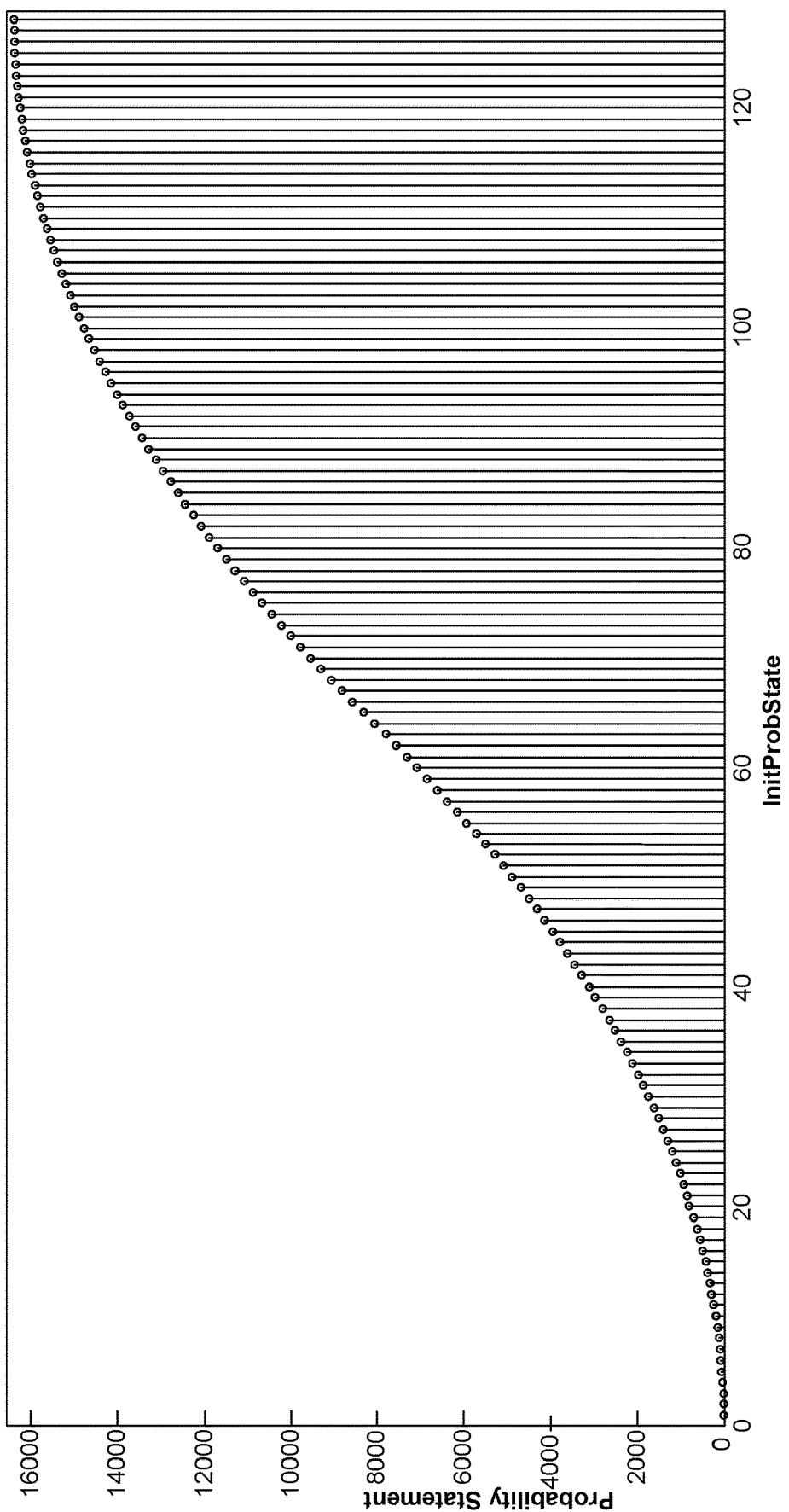

Initialization in the Quadratic Domain. The above examples may be for scenarios where the output of the initialization process represents the probability state in the linear domain. However, for some input sources, it may be desirable to make the probability state represent the probability in the logarithmic domain, corresponding to representing the entropy in the linear domain. To achieve representation in the logarithmic domain, this disclosure proposes to use the probability states in the quadratic domain. FIGS. 17A and 17B show an example of the mapping from quadratic domain InitProb State to the linear probabilities used in the arithmetic coding engine of VVC, which looks like the mapping for logarithmic InitProb State (see FIGS. 11A-11B), but can be implemented by multiplications (note that LUT storing all the possible multiplication results may be generated beforehand for use if preferred by certain implementation). Below is an example, $$\text{slope} = \text{int}(\text{initId} \& 0x0F) - 8;$$

$$\text{offset} = \text{int}(\text{initId} \& 0xF0) - 128;$$

$$shp = \text{offset} + ((\text{slope}*(qp-32)) >> 1);$$

$$idx = \text{Clip3}(-127, 127, shp);$$

$$val = 128 - \text{abs}(idx);$$

$$p1 = (idx < 0 ? 32768 - val^2 : val^2);$$

$$\text{ProbabilityState}L = p1 >> 1$$

$$\text{ProbabilityState}H = p1 >> 5$$

where initId is the initialization value with the high and low nibble representing slope and offset, respectively, and idx means the probability state with 8-bit precision and centering at 0.

Note that the method proposed in this section can be combined with using higher intermediate precision as introduced above.

Figure 18A:
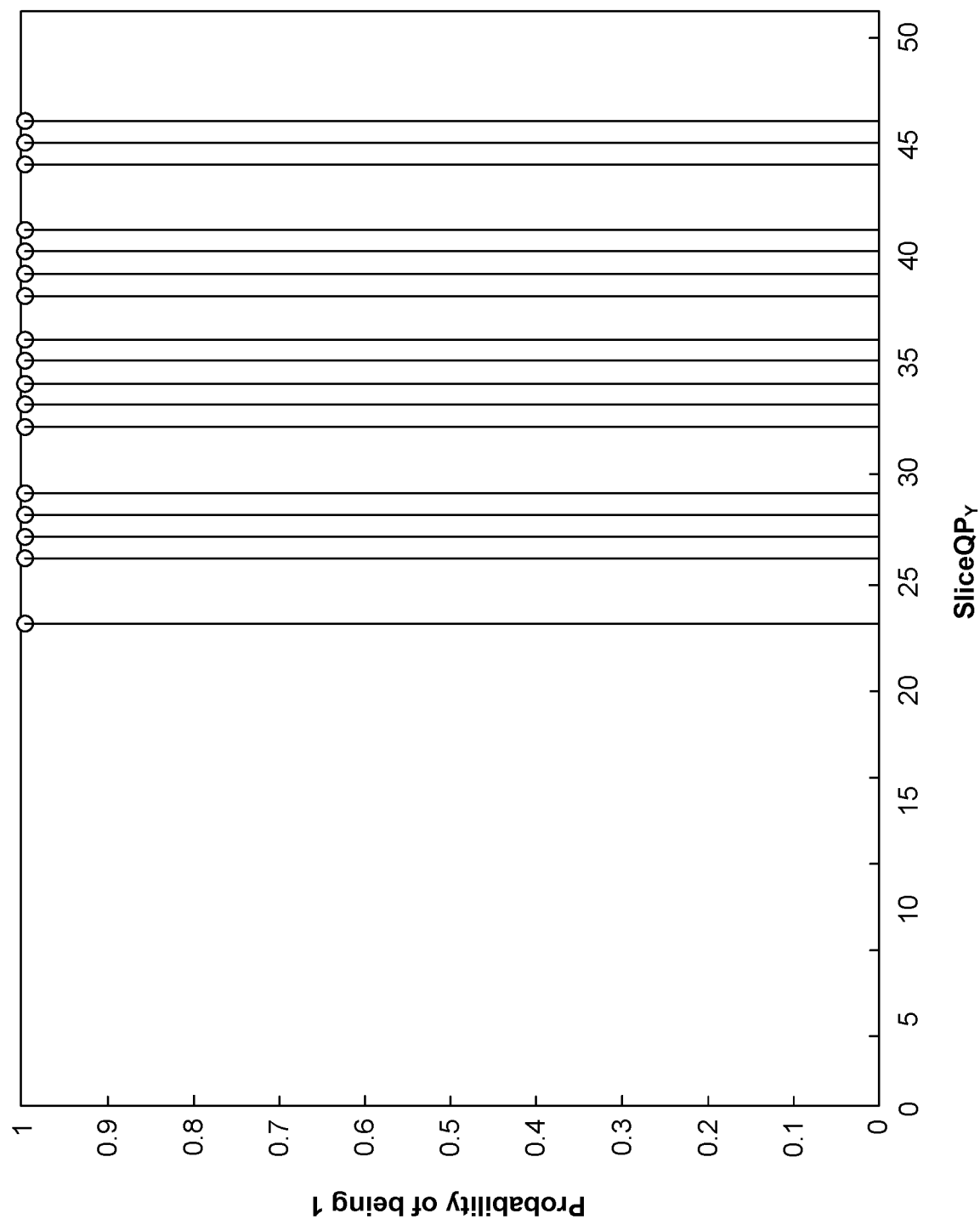
FIGS. 18A and 18B are graphs illustrating examples of extreme probability distributions.
Figure 18B:
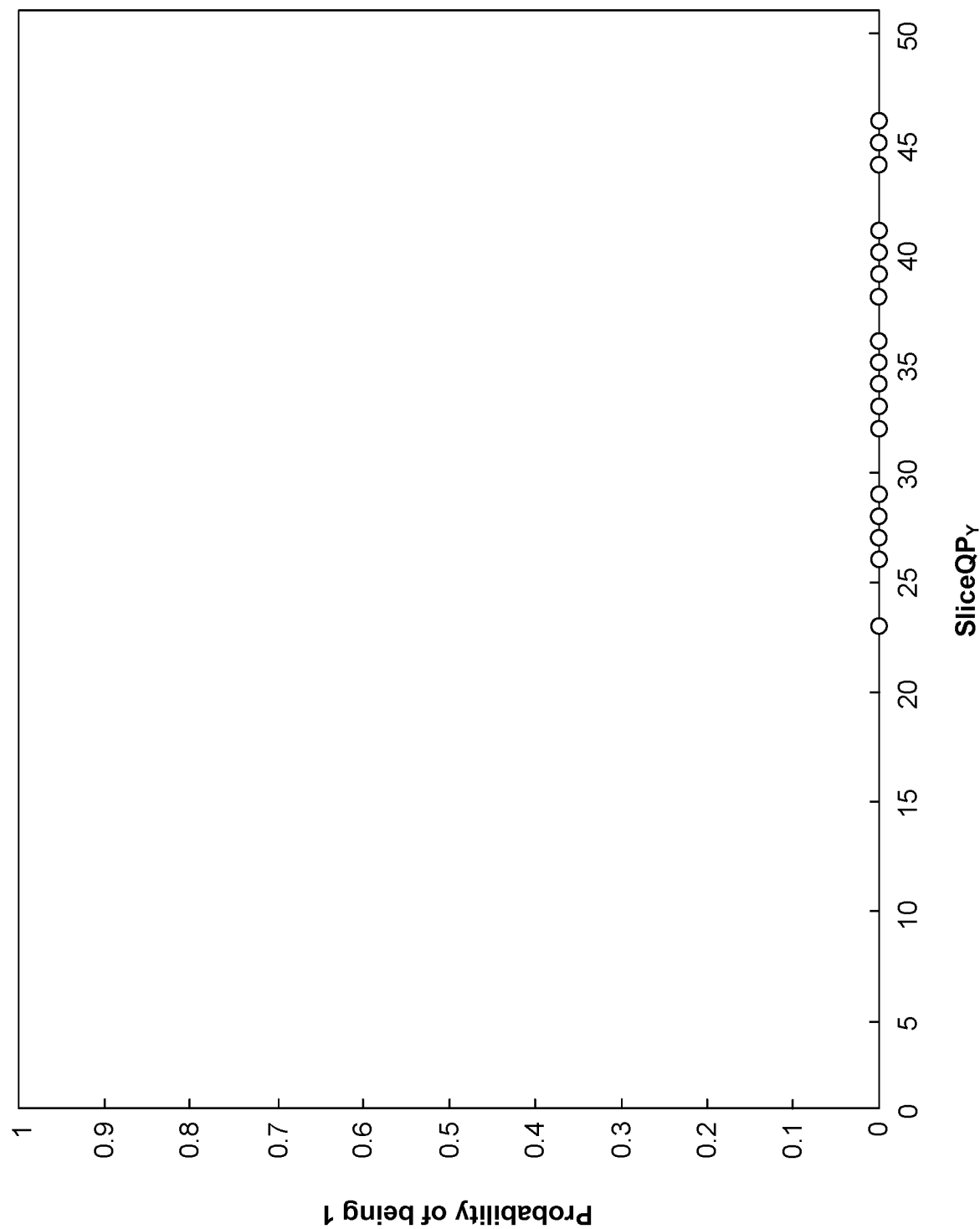

Initialization for Extreme Probability Distributions. A large number of bins may have extreme probability distributions, meaning that these bins have a very high probability of being 1 or 0, regardless of SliceQP$_Y$. FIGS. 18A and 18B are graphs illustrating examples of extreme probability distributions.

To model such extreme probability distributions, the slope may have to be 0, and the initial probability state may depend only on n (see Eqs. (2) and (7)). As such, the initial probability state may not change along with the quantization parameter (QP). The formula deriving n, as in Eq. (2) or Eq. (7), may be designed such that probabilities approaching 0 and 1 can both be efficiently represented. The following examples are based on 7-bit representation (0 to 127) of probability states and can be extended to other precisions.

Take Eq. (2) as an example. With OffsetIdx ranging from 0 to 15, the maximum value of n that may be reached is 104, representing the probability 0.8189 (i.e., 104/128), which is far from 1.0.

In "Simplification of the initialization process for context variables", JVET-N0301, Geneva, CH, Mar. 19-27, 2019, n is derived with 10-bit precision, with OffsetIdx ranging from 0 to 7, as in Eq. (19).

$$n=((\text{OffsetIdx}*5)<<5)+32 \quad (19)$$

Its equivalent 7-bit representation of n is shown in Eq. (20), $$n=((\text{OffsetIdx}*5)<<2)+4 \quad (20)$$

where the probability closest to 0 it can reach is 0.0313 (OffsetIdx equal to 0 and n equal to 4, 4/128=0.0313) and the probability closest to 1.0 it can reach is 0.9688 (OffsetIdx equal to 6 and n equal to 124, 124/128=0.9688). However, such approximations may not be precise enough to represent the extreme probability distributions.

In accordance with one or more techniques of this disclosure, a video coder may utilize one or more of the following formulas to derive an initialization parameter (e.g., n).
1. If OffsetIdx is 3-bit (from 0 to 7), n may be derived as shown in Eq. (21).

$$n=(\text{OffsetIdx}*18)+1 \quad (21)$$

2. If OffsetIdx is 4-bit (from 0 to 15), n may be derived as shown in Eq. (22).

$$n=(\text{OffsetIdx}*9)+1 \quad (22)$$

As can be seen, in either case, n can reach 1 and 127, meaning the probabilities of 0.0078 (i.e., 1/128) and 0.9922 (i.e., 127/128) can be reached. Such probabilities may be close enough to 0 and 1, respectively. In this way, the techniques of this disclosure enable a video coder to initialize extreme probability distributions more precisely, which may reduce the bitrate of coded video data.

In some examples, m, n, and/or initState may be determined in accordance with one of the following equations:

$$m=\text{slopeIdx}*4-36$$

$$n=\text{OffsetIdx}*9+1$$

$$\text{initState}=(m*(qp-24)>>4)+n \quad (23)$$

$$m=\text{slopeIdx}*8-32$$

$$n=\text{OffsetIdx}*18+1$$

$$\text{initState}=(m*(qp-16)>>4)+n \quad (24)$$

$$m=\text{slopeIdx}*5-45$$

$$n=\text{OffsetIdx}*8+7$$

$$\text{initState}=(m*(qp-32)>>4)+n \quad (25)$$

Figure 4A:
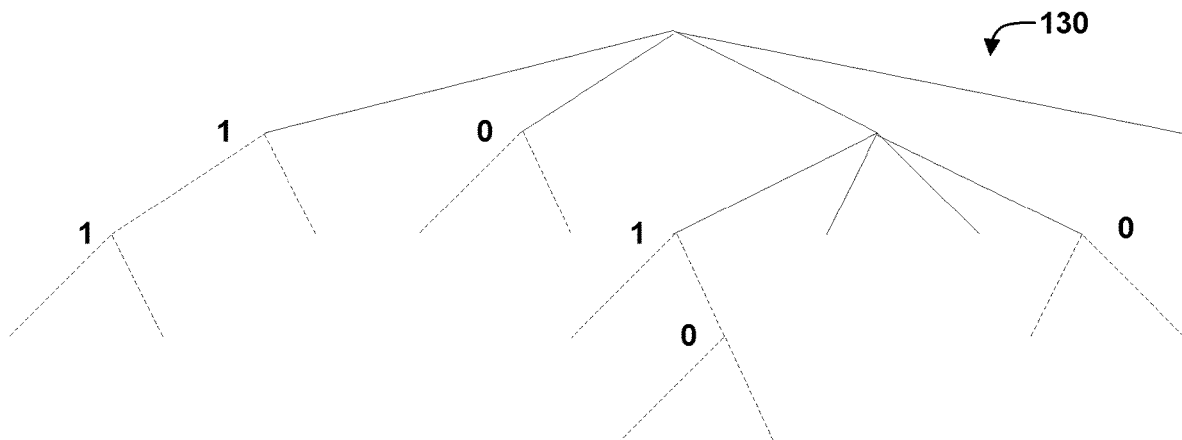
FIGS. 4A and 4B are conceptual diagrams illustrating an example quadtree binary tree (QTBT) structure, and a corresponding coding tree unit (CTU).
Figure 4B:
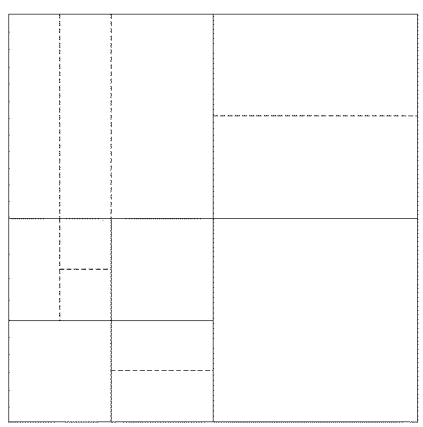

FIGS. 4A and 4B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level (i.e., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 4B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies that no further horizontal splitting is permitted. Similarly, a binary tree node having a height equal to MinBTSize implies that no further vertical splitting is permitted for that binary tree node. As noted above, leaf nodes of the binary tree are referred to as CUs, and are further processed according to prediction and transform without further partitioning.

Figure 5:
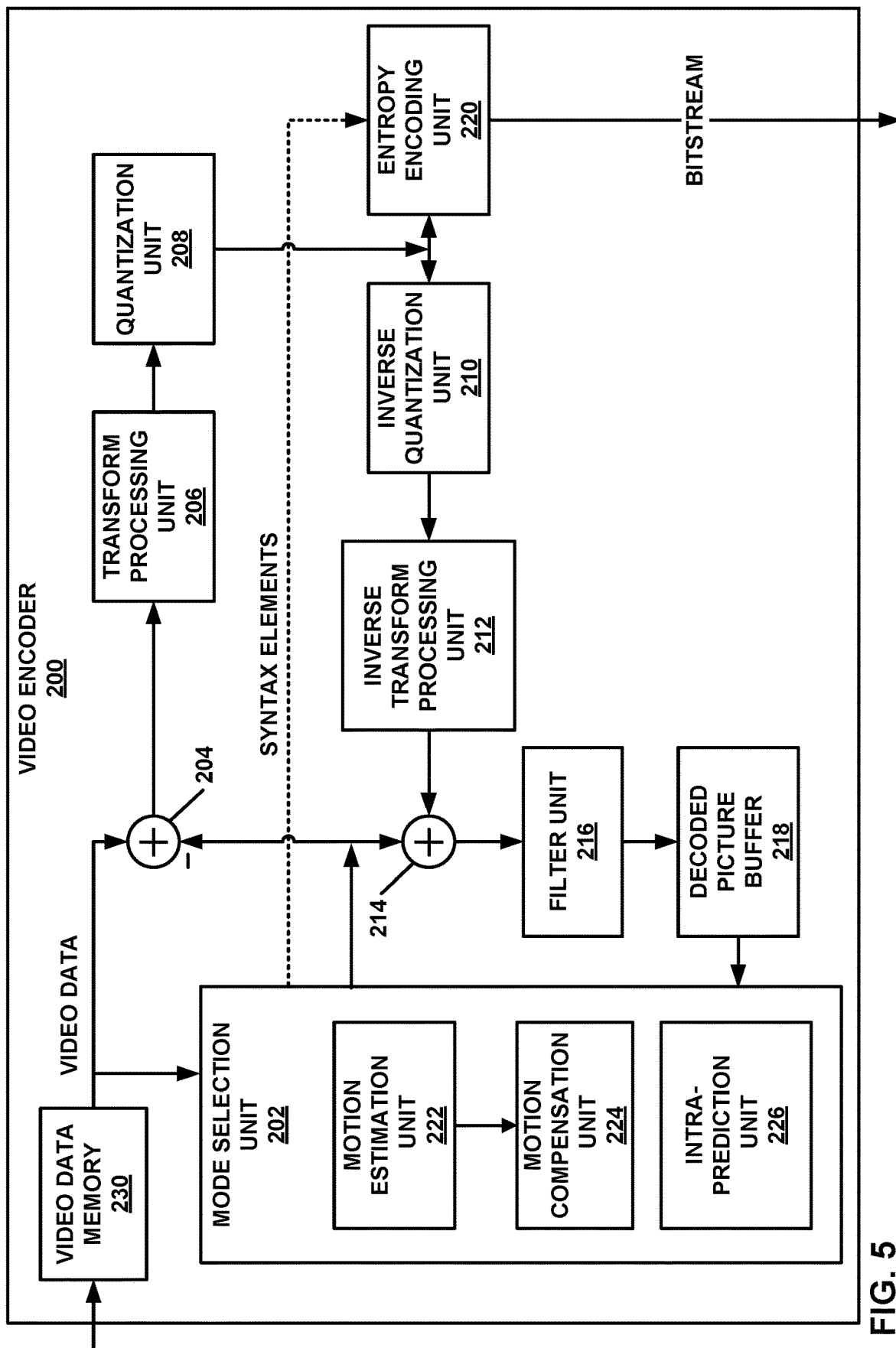
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Figure 6:
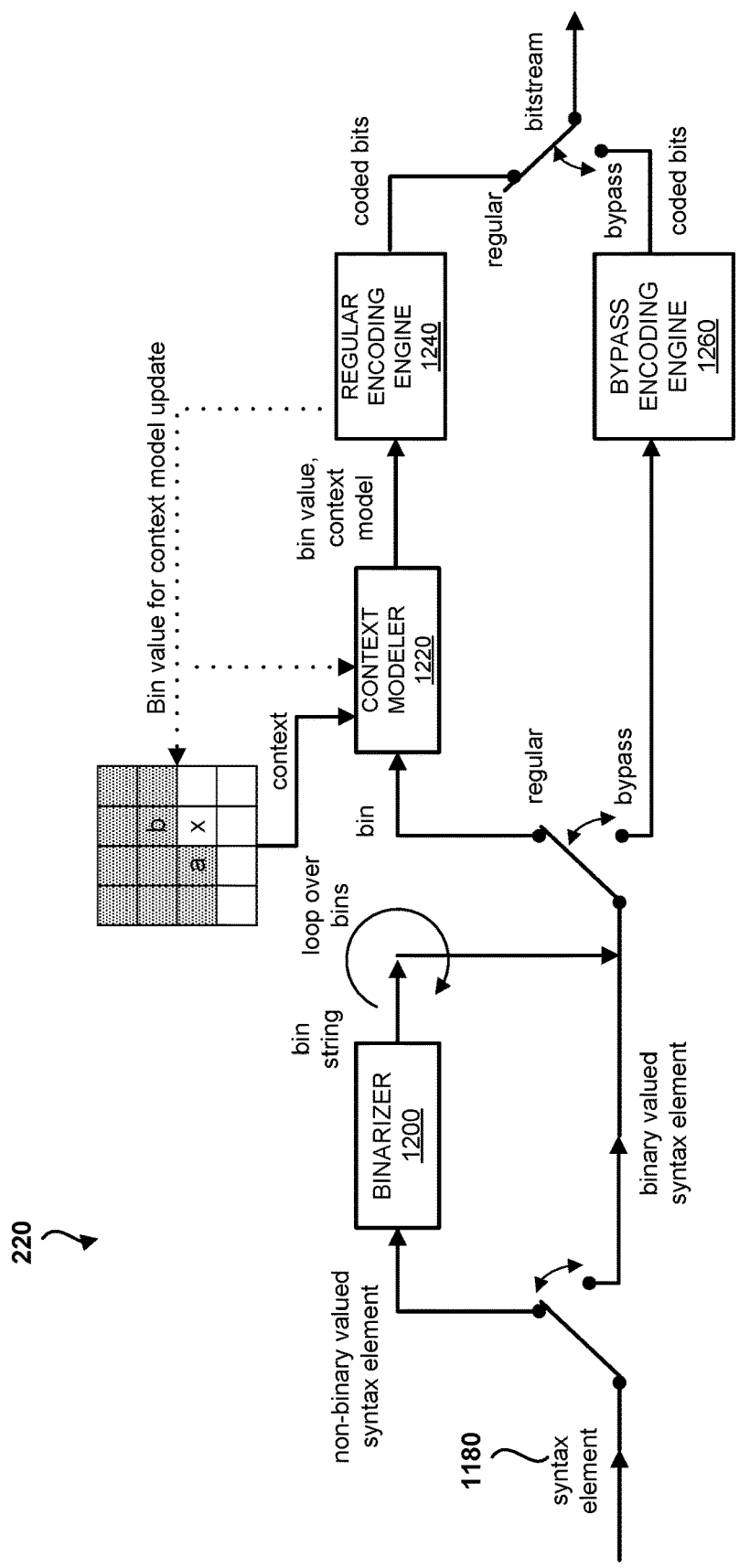
FIG. 6 is a block diagram illustrating a context adaptive binary arithmetic coder in a video encoder.

FIG. 6 is a block diagram of an example entropy encoding unit 220 that may be configured to perform CABAC in accordance with the techniques of this disclosure. A syntax element 1180 is input into the entropy encoding unit 220. If the syntax element is already a binary-value syntax element (e.g., a flag or other syntax element that only has a value of 0 and 1), the step of binarization may be skipped. If the syntax element is a non-binary valued syntax element (e.g., a syntax element that may have values other than 1 or 0), the non-binary valued syntax element is binarized by binarizer 1200. Binarizer 1200 performs a mapping of the non-binary valued syntax element into a sequence of binary decisions. These binary decisions are often called "bins." For example, for transform coefficient levels, the value of the level may be broken down into successive bins, each bin indicating whether or not the absolute value of coefficient level is greater than some value. For example, bin 0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 1200 is fed to the binary arithmetic coding side of entropy encoding unit 220. That is, for a predetermined set of non-binary valued syntax elements, each bin type (e.g., bin 0) is coded before the next bin type (e.g., bin 1). Coding may be performed in either regular mode or bypass mode. In bypass mode, bypass encoding engine 1260 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin is predictable given the values of previously coded bins. The probability of a bin being an LPS is determined by context modeler 1220. Context modeler 1220 outputs the bin value and the probability state for the context (e.g., the probability state σ, including the value of the LPS and the probability of the LPS occurring). The context may be an initial context for a series of bins, or may be determined based on the coded values of previously coded bins. As described above, context modeler 1220 may update the state based on whether or not the received bin was the MPS or the LPS. After the context and probability state σ is determined by context modeler 1220, regular encoding engine 1240 performs BAC on the bin value.

Returning to FIG. 5, video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Figure 7:
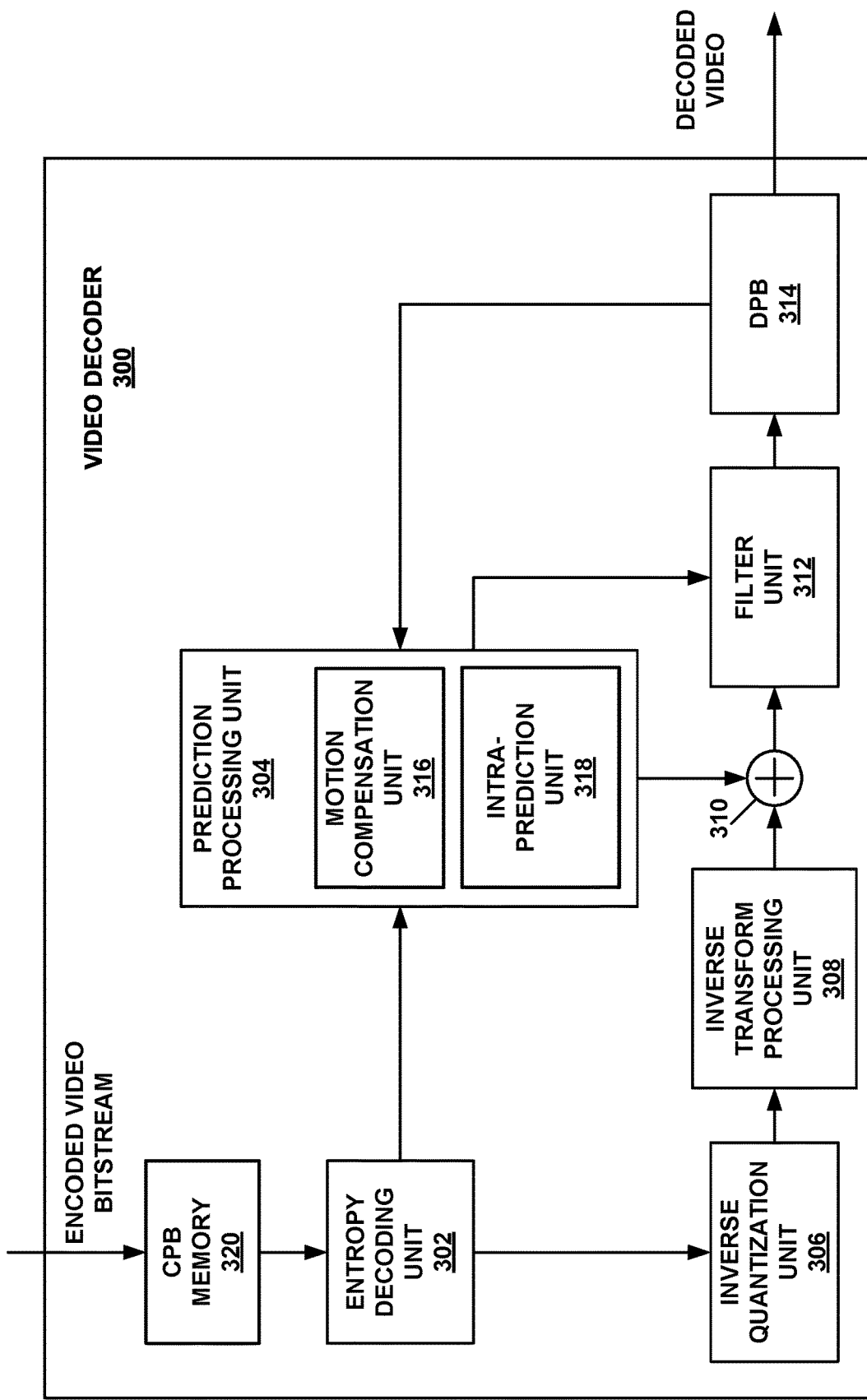
FIG. 7 is a block diagram illustrating an example video decoder that may perform the techniques of this disclosure.

Video encoder 200 represents an example of a device configured to encode video data including a memory configured to store video data, and one or more processing units implemented in circuitry and configured to obtain a pre-defined slope index (e.g., SlopeIdx) and a pre-defined offset index (e.g., OffsetIdx) for a context of a plurality of contexts used in a context-adaptive entropy coding process to entropy code a value for a syntax element in a slice of the video data; determine, based on the pre-defined slope index and the pre-defined offset index, an initial probability state of the context for the slice of the video data; and entropy encode, based on the initial probability state of the context, a bin of the value for the syntax element FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

Figure 8:
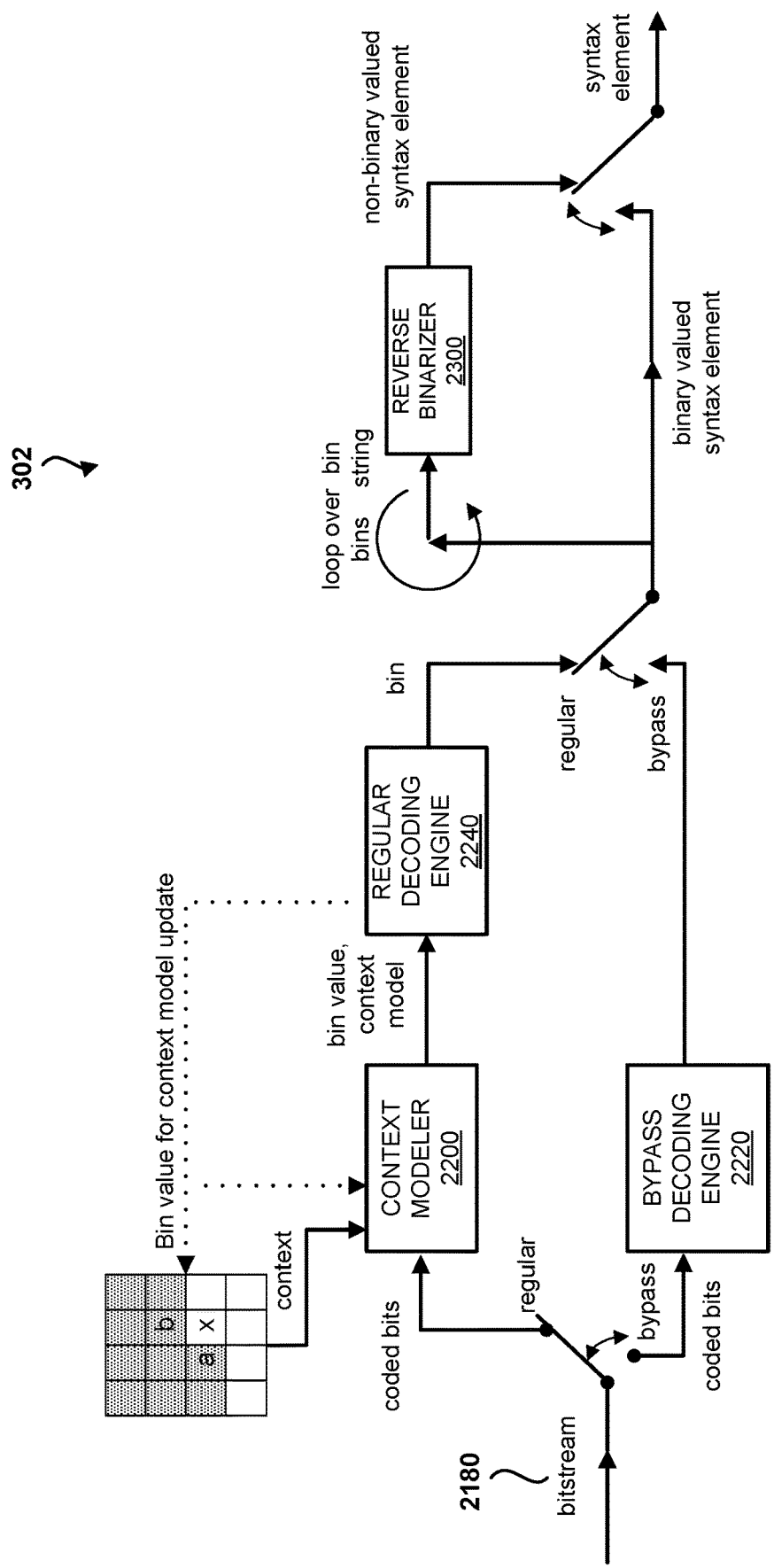
FIG. 8 is a block diagram illustrating a context adaptive binary arithmetic coder in a video decoder.

FIG. 8 is a block diagram of an example entropy decoding unit 302 that may be configured to perform CABAC in accordance with the techniques of this disclosure. The entropy decoding unit 302 of FIG. 8 performs CABAC in an inverse manner as that of entropy encoding unit 220 described in FIG. 6. Coded bits from bitstream 2180 are input into entropy decoding unit 302. The coded bits are fed to either context modeler 2200 or bypass decoding engine 2220 based on whether they were entropy coded using regular mode or bypass mode. If the coded bits were coded in bypass mode, bypass decoding engine will use Golomb-Rice or exponential Golomb decoding, for example, to retrieve the binary-valued syntax elements or bins of non-binary syntax elements.

If the coded bits were coded in regular mode, context modeler 2200 may determine a probability model for the coded bits and regular decoding engine 2240 may decode the coded bits to produce bins of non-binary valued syntax elements (or the syntax elements themselves if binary-valued). After the context and probability state a is determined by context modeler 2200, regular decoding engine 2240 performs BAC to decode the bin value. In other words, regular decoding engine 2240 may determine a probability state of a context, and decode a bin value based on previously coded bins and a current range. After decoding the bin, context modeler 2200 may update the probability state of the context based on the window size and the value of the decoded bin.

Returning to FIG. 7, in general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to obtain a pre-defined slope index (e.g., SlopeIdx) and a pre-defined offset index (e.g., OffsetIdx) for a context of a plurality of contexts used in a context-adaptive entropy coding process to entropy code a value for a syntax element in a slice of the video data; determine, based on the pre-defined slope index and the pre-defined offset index, an initial probability state of the context for the slice of the video data; and entropy decode, based on the initial probability state of the context, a bin of the value for the syntax element.

Figure 19:
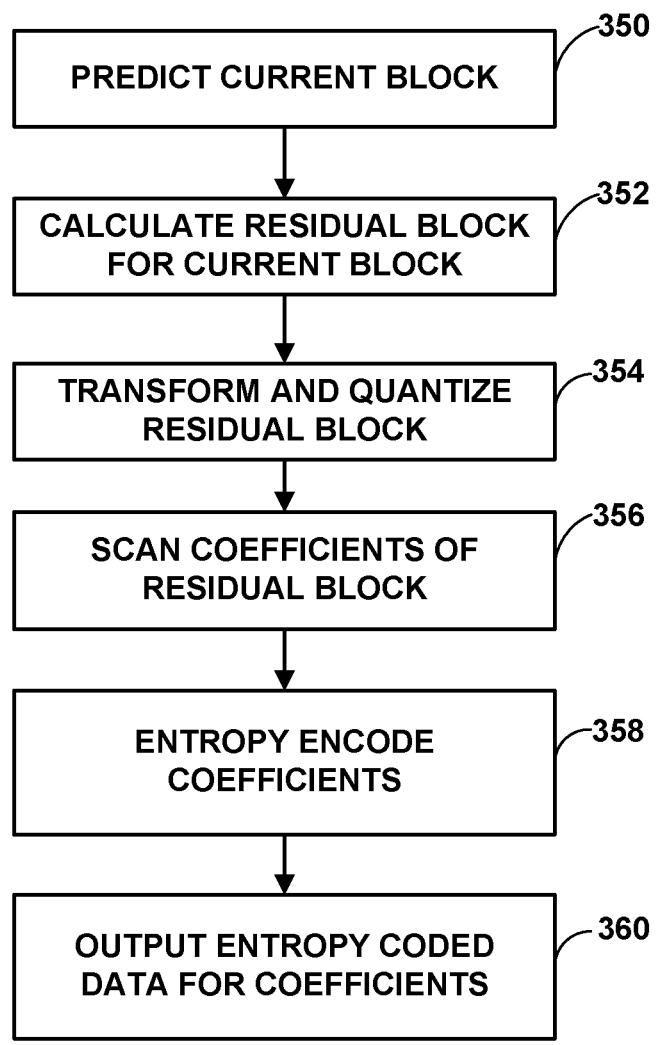
FIG. 19 is a flowchart illustrating an example method for encoding a current block.

FIG. 19 is a flowchart illustrating an example method for encoding a current block. The current block may comprise a current CU. Although described with respect to video encoder 200 (FIGS. 1 and 5), it should be understood that other devices may be configured to perform a method similar to that of FIG. 19.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients, and/or other syntax elements, using CAVLC or CABAC using the techniques for probability initialization discussed above and with reference to FIG. 20. Video encoder 200 may then output the entropy coded data of the block (360).

Figure 20:
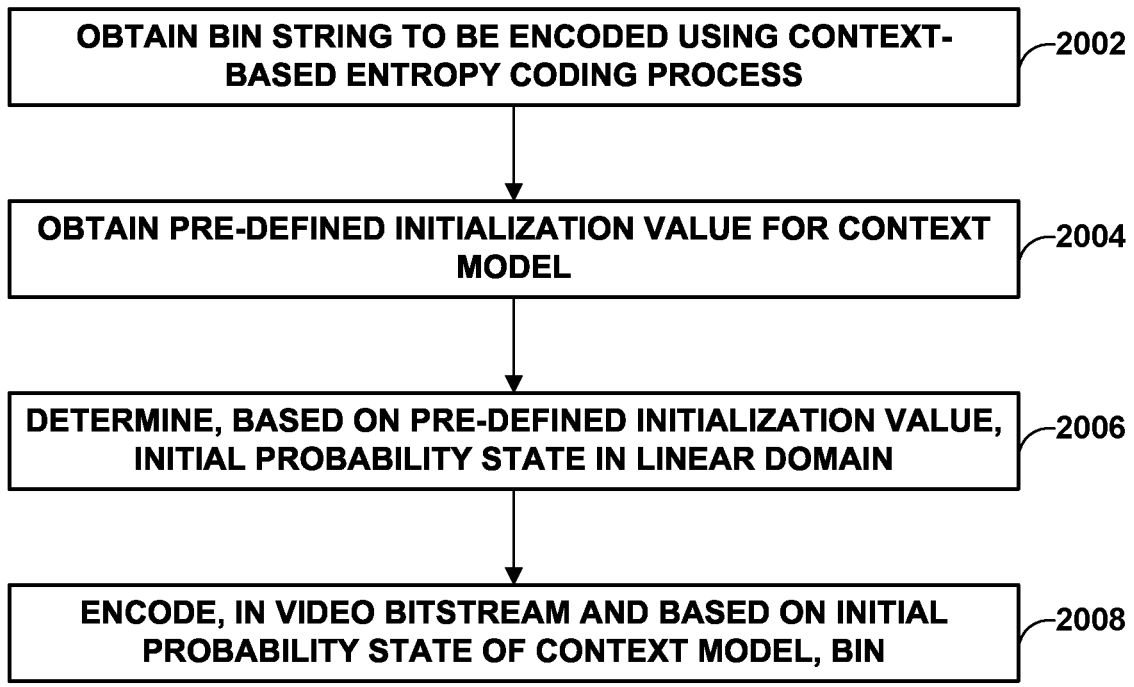
FIG. 20 is a flowchart illustrating an example process for performing context-based entropy encoding, in accordance with one or more techniques of this disclosure.

FIG. 20 is a flowchart illustrating an example process for performing context-based entropy encoding, in accordance with one or more techniques of this disclosure. The techniques of FIG. 20 may be performed by a video encoder, such as video encoder 200 illustrated in FIGS. 1, 5, and 6. For purposes of illustration, the techniques of FIG. 20 are described within the context of video encoder 200 of FIGS. 1, 5, and 6, although video encoders having configurations different than that of video encoder 200 may perform the techniques of FIG. 20.

Video encoder 200 may obtain a bin string (e.g., a one-dimensional binary vector) to be encoded using context-based entropy coding (e.g., CABAC) (2002). For instance, entropy encoding unit 220 of video encoder 200 may obtain the bin string by binarizing a syntax element received from mode selection unit 202 of video encoder 200.

Video encoder 200 may obtain a pre-defined initialization value for a context of a plurality of contexts (2004). For instance, entropy encoding unit 220 of video encoder 200 may obtain a value of initValue, which may be a six-bit variable.

Video encoder 200 may determine, based on the pre-defined initialization value, an initial probability state of the context for the independently codable unit (e.g., slice, tile, etc.) of the video data in the linear domain (2006). For instance, entropy encoding unit 220 may determine the initial probability state of the context in the linear domain without intermediately determining the initial probability state of the context in the logarithmic domain. In some examples, entropy encoding unit 220 may determine the initial probability state without using a LUT to convert the initial probability state from the logarithmic domain to the linear domain.

To determine the initial probability state, entropy encoding unit 220 may obtain an initial value of a quantization parameter associated with the independently codable unit (e.g., $SliceQP_Y$), and obtain a value of a quantization parameter anchor point that is not zero (e.g., $QP_{anchor}$). Entropy encoding unit 220 may determine the initial probability state based on a difference between the initial value of the quantization parameter for the slice and the value of the quantization parameter anchor point. For instance, entropy encoding unit 220 may determine the initial probability state in accordance with the following equation:

$$InitProbState=((m*(SliceQP_Y-QP_{anchor}))>>rshift)+n.$$

where InitProbState is the initial probability state, $SliceQP_Y$ is the initial value of the quantization parameter, $QP_{anchor}$ is the quantization parameter anchor point, and rshift is a right shift value.

As discussed above, in some examples, entropy encoding unit 220 may be configured to perform the initialization with increased precision for extreme probability distributions. For instance, entropy encoding unit 220 may determine, based on the pre-defined initialization value, a slope index value and an offset index value. Entropy encoding unit 220 may determine, based on the slope index value, a value of m; and determine, based on the offset index value, a value of n. In some examples, entropy encoding unit 220 may determine the value of n, in accordance with the following equation n=(OffsetIdx*18)+1 where OffsetIdx is the offset index value. As shown above, in some examples, entropy encoding unit 220 may determine the initial probability state based on the value of m and the value of n.

Video encoder 200 may encode, in a video bitstream and based on the initial probability state of the context, a bin of the bin string (2008). For instance, entropy encoding unit 220 may output a binary stream that represents a value or pointer to a probability within a final coded probability interval of the context.

Figure 21:
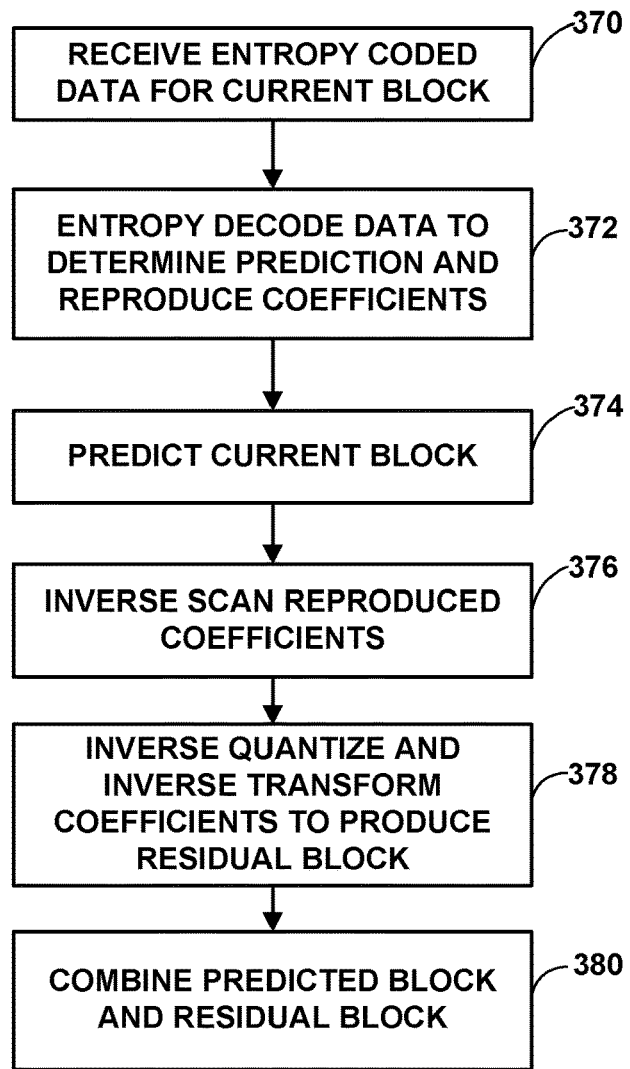
FIG. 21 is a flowchart illustrating an example method for decoding a current block.

FIG. 21 is a flowchart illustrating an example method for decoding a current block of video data. The current block may comprise a current CU. Although described with respect to video decoder 300 (FIGS. 1 and 7), it should be understood that other devices may be configured to perform a method similar to that of FIG. 21.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). For example, video decoder 300 may decode the coefficients, and/or other syntax elements, using CAVLC or CABAC using the techniques for probability initialization discussed above and with reference to FIG. 22. Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 22:
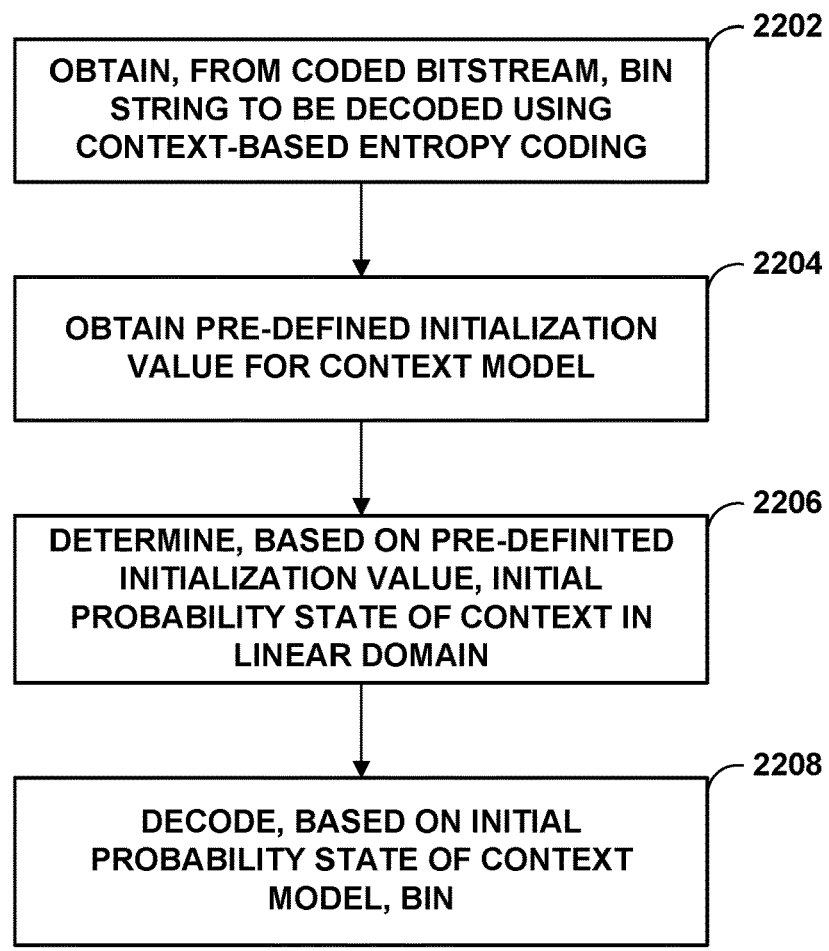
FIG. 22 is a flowchart illustrating an example process for performing context-based entropy decoding, in accordance with one or more techniques of this disclosure.

FIG. 22 is a flowchart illustrating an example process for performing context-based entropy decoding, in accordance with one or more techniques of this disclosure. The techniques of FIG. 22 may be performed by a video decoder, such as video decoder 300 illustrated in FIGS. 1, 7, and 8. For purposes of illustration, the techniques of FIG. 22 are described within the context of video decoder 300 of FIGS. 1, 7, and 8, although video decoders having configurations different than that of video decoder 300 may perform the techniques of FIG. 22.

Video decoder 300 may obtain, from a video bitstream, a bin string (e.g., a one-dimensional binary vector) to be decoded using context-based entropy coding (2202). For instance, entropy decoding unit 302 of video decoder 300 may obtain, from CPB memory 320, the bin string. In some examples, the bin string may represent a value or pointer to a probability within a final coded probability interval of a context. In some examples, context-based entropy coding may comprise context-adaptive binary arithmetic coding (CABAC).

Video decoder 300 may obtain a pre-defined initialization value for a context of a plurality of contexts (2204). For instance, entropy decoding unit 302 of video decoder 300 may obtain a value of initValue, which may be a six-bit variable.

Video decoder 300 may determine, based on the pre-defined initialization value, an initial probability state of the context for the independently codable unit of the video data (e.g., slice, tile, etc.) in the linear domain (2206). For instance, entropy decoding unit 302 may determine the initial probability state of the context in the linear domain without intermediately determining the initial probability state of the context in the logarithmic domain. In some examples, entropy decoding unit 302 may determine the initial probability state without using a LUT to convert the initial probability state from the logarithmic domain to the linear domain.

To determine the initial probability state, entropy decoding unit 302 may obtain an initial value of a quantization parameter for the independently codable unit (e.g., $SliceQP_Y$), and obtain a value of a quantization parameter anchor point that is not zero (e.g., $QP_{anchor}$). Entropy decoding unit 302 may determine the initial probability state based on a difference between the initial value of the quantization parameter for the independently codable unit and the value of the quantization parameter anchor point. For instance, entropy decoding unit 302 may determine the initial probability state in accordance with the following equation:

$$InitProbState=((m*(SliceQP_Y-QP_{anchor}))>>rshift)+n.$$

where InitProbState is the initial probability state, $SliceQP_Y$ is the initial value of the quantization parameter, $QP_{anchor}$ is the quantization parameter anchor point, and rshift is a right shift value.

As discussed above, in some examples, entropy decoding unit 302 may be configured to perform the initialization with increased precision for extreme probability distributions. For instance, entropy decoding unit 302 may determine, based on the pre-defined initialization value, a slope index value and an offset index value. Entropy decoding unit 302 may determine, based on the slope index value, a value of m; and determine, based on the offset index value, a value of n. In some examples, entropy decoding unit 302 may determine the value of n, in accordance with the following equation n=(OffsetIdx*18)+1 where OffsetIdx is the offset index value. As shown above, in some examples, entropy decoding unit 302 may determine the initial probability state based on the value of m and the value of n.

Video decoder 300 may decode, based on the initial probability state of the context, a bin of the bin string (2208). Video decoder 300 may determine, based on the decoded bin and the initial probability state of the context, an updated probability state of the context. Video decoder 300 may decode, based on the updated probability state of the context, another bin (2206).

The following numbered examples may illustrate one or more aspects of the disclosure:

Example 1A

A method for entropy coding of video data, the method comprising: obtaining a pre-defined slope index and a pre-defined offset index for a context of a plurality of contexts used in a context-adaptive entropy coding process to entropy code a value for a syntax element in a slice of the video data; determining, based on the pre-defined slope index and the pre-defined offset index, an initial probability state of the context for the slice of the video data; and entropy coding, based on the initial probability state of the context, a bin of the value for the syntax element.

Example 2A

The method of example 1A, wherein the initial probability state represents an initial probability in a linear domain.

Example 3A

The method of example 1A, wherein the initial probability state represents an initial probability in a quadratic domain.

Example 4A

The method of example 3A, wherein determining the initial probability state is performed without using a look up table (LUT) to map between the pre-defined slope index, the pre-defined offset index, and the initial probability state.

Example 5A

The method of any combination of examples 1A-4A, wherein the initial probability state is represented by InitProbState, the slope index is represented by SlopeIdx, and the offset index is represented by OffsetIdx.

Example 6A

The method of any of examples 1A-5A, wherein the context-adaptive entropy coding process comprises a context-adaptive binary arithmetic coding (CABAC) process, or a context-adaptive variable length coding (CAVLC) process.

Example 7A

The method of any of examples 1A-6A, wherein coding comprises decoding.

Example 8A

The method of any of examples 1A-7A, wherein coding comprises encoding.

Example 9A

A device for coding video data, the device comprising one or more means for performing the method of any of examples 1A-8A.

Example 10A

The device of example 9A, wherein the one or more means comprise one or more processors implemented in circuitry.

Example 11A

The device of any of examples 9A and 10A, further comprising a memory to store the video data.

Example 12A

The device of any of examples 9A-11A, further comprising a display configured to display decoded video data.

Example 13A

The device of any of examples 9A-12A, wherein the device comprises one or more of a camera, a computer, a mobile device, a broadcast receiver device, or a set-top box.

Example 14A

The device of any of examples 9A-13A, wherein the device comprises a video decoder.

Example 15A

The device of any of examples 9A-14A, wherein the device comprises a video encoder.

Example 16A

A computer-readable storage medium having stored thereon instructions that, when executed, cause one or more processors to perform the method of any of examples 1A-8A.

Example 1B

A method for entropy coding of video data, the method comprising: obtaining a pre-defined offset index for a context of a plurality of contexts used in a context-adaptive entropy coding process to entropy code a value for a syntax element in a slice of the video data; determining, based on the pre-defined offset index, an initial probability state of the context for the slice of the video data; and entropy coding, based on the initial probability state of the context, a bin of the value for the syntax element.

Example 2B

The method of example 1B, wherein the initial probability state represents an initial probability in a linear domain.

Example 3B

The method of example 1B, wherein the initial probability state represents an initial probability in a quadratic domain.

Example 4B

The method of example 3B, wherein determining the initial probability state is performed without using a look up table (LUT) to map between the pre-defined offset index and the initial probability state.

Example 5B

The method of any combination of examples 1B-4B, wherein the initial probability state is represented by InitProbState, and the offset index is represented by OffsetIdx.

Example 6B

The method of any of examples 1B-5B, wherein the context-adaptive entropy coding process comprises a context-adaptive binary arithmetic coding (CABAC) process, or a context-adaptive variable length coding (CAVLC) process.

Example 7B

The method of any of examples 1B-6B, wherein coding comprises decoding.

Example 8B

The method of any of examples 1B-7B, wherein coding comprises encoding.

Example 9B

A device for coding video data, the device comprising one or more means for performing the method of any of examples 1B-8B.

Example 10B

The device of example 9B, wherein the one or more means comprise one or more processors implemented in circuitry.

Example 11B

The device of any of examples 9B and 10B, further comprising a memory to store the video data.

Example 12B

The device of any of examples 9B-11B, further comprising a display configured to display decoded video data.

Example 13B

The device of any of examples 9B-12B, wherein the device comprises one or more of a camera, a computer, a mobile device, a broadcast receiver device, or a set-top box.

Example 14B

The device of any of examples 9B-13B, wherein the device comprises a video decoder.

Example 15B

The device of any of examples 9B-14B, wherein the device comprises a video encoder.

Example 16B

A computer-readable storage medium having stored thereon instructions that, when executed, cause one or more processors to perform the method of any of examples 1B-8B.

Example 1C

A method for entropy coding of video data, the method comprising: determining, based on a value of a variable, a first intermediate value; determining, based on the first intermediate value, a value of a low precision probability state of a context model, wherein determining the value of the low precision probability state comprises right-shifting the first intermediate value; and coding, based on the value of the low precision probability state of the context model, a value of at least one bit of a syntax element.

Example 2C

The method of example 1C, wherein determining the first intermediate value comprises determining the first intermediate value in accordance with the following equation: q=Clip3(18, 46, SliceQP$_Y$)−16 where q is the first intermediate value, and SliceQP$_Y$ is the value of the variable.

Example 3C

The method of example 1C or example 2C, wherein determining the value of the low precision probability state of the context model comprises determining the value of the low precision probability state of the context model in accordance with the following equation: ProbabilityStateL=16*a+((b−a)*q>>1)+8 where q is the first intermediate value, ProbabilityStateL is the value of the low precision probability state of the context model, a is a second intermediate value, and b is a third intermediate value.

Example 4C

The method of example 3C, further comprising determining values for a and b in accordance with the following equations: a=(initValue>>3)*9 b=(initValue & 7)*9 where initValue is an initialization value.

Example 5C

The method of any of examples 1C-4C, further comprising determining, based on the value of the low precision probability state of the context model, a value of a high precision probability state of the context model.

Example 6C

The method of example 5C, wherein determining the value of the high precision probability state of the context model comprises determining the value of the high precision probability state of the context model in accordance with the following equation: ProbabilityStateH=ProbabilityStateL<<4 where ProbabilityStateH is the value of the high precision probability state of the context model, and ProbabilityStateL is the value of the low precision probability state of the context model.

Example 7C

The method of any of examples 1C-6C, wherein the context-adaptive entropy coding process comprises a context-adaptive binary arithmetic coding (CABAC) process, or a context-adaptive variable length coding (CAVLC) process.

Example 8C

The method of any of examples 1C-7C, wherein coding comprises decoding.

Example 9C

The method of any of examples 1C-8C, wherein coding comprises encoding.

Example 10C

A device for coding video data, the device comprising one or more means for performing the method of any of examples 1C-9C.

Example 11C

The device of example 10C, wherein the one or more means comprise one or more processors implemented in circuitry.

Example 12C

The device of any of examples 10C and 11C, further comprising a memory to store the video data.

Example 13C

The device of any of examples 10C-12C, further comprising a display configured to display decoded video data.

Example 14C

The device of any of examples 10C-13C, wherein the device comprises one or more of a camera, a computer, a mobile device, a broadcast receiver device, or a set-top box.

Example 15C

The device of any of examples 10C-14C, wherein the device comprises a video decoder.

Example 16C

The device of any of examples 10C-15C, wherein the device comprises a video encoder.

Example 17C

A computer-readable storage medium having stored thereon instructions that, when executed, cause one or more processors to perform the method of any of examples 1C-9C.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for entropy decoding of video data, the method comprising: retrieving, from a memory, a pre-defined initialization value for a context of a plurality of contexts used in a context-adaptive entropy coding process to entropy code a value for a syntax element for an independently codable unit of video data; determining, based on the pre-defined initialization value, a slope index value and an offset index value; determining, based on the slope index value, a value of a parameter, m; determining, based on the offset index value, a value of a parameter, n in accordance with the following equation n=(OffsetIdx*18)+1 where OffsetIdx is the offset index value; obtaining an initial value of a quantization parameter associated with the independently codable unit; determining, based on the pre-defined initialization value, the parameter m, the parameter n, and the initial value of the quantization parameter, an initial probability state of the context, wherein determining the initial probability state is further based on a difference between the initial value of the quantization parameter associated with the independently codable unit and a non-zero value that defines a quantization parameter anchor point; and entropy decoding, from a video bitstream and based on the initial probability state of the context, a bin of the value for the syntax element.

2. The method of claim 1, wherein determining the initial probability state of the context comprises determining the initial probability state of the context in the linear domain without intermediately determining the initial probability state of the context in the logarithmic domain.

3. The method of claim 1, wherein the initial value of the quantization parameter is $SliceQP_Y$.

4. The method of claim 1, wherein the value defining the quantization parameter anchor point is 16.

5. The method of claim 1, wherein determining the initial probability state comprises determining the initial probability state in accordance with the following equation:

$$InitProbState=clip3(1,127,((m*(SliceQP_Y-QP_{anchor}))>>rshift)+n),$$

where InitProbState is the initial probability state, $SliceQP_Y$ is the initial value of the quantization parameter, $QP_{anchor}$ is the quantization parameter anchor point, and rshift is a right shift value.

6. The method of claim 1, wherein entropy decoding comprises entropy decoding using context adaptive binary arithmetic coding (CABAC).

7. A video decoding device comprising: a memory storing video data; and one or more processors implemented in circuitry and configured to: retrieve, from the memory, a pre-defined initialization value for a context of a plurality of contexts used in a context-adaptive entropy coding process to entropy code a value for a syntax element for an independently codable unit of video data; determine, based on the pre-defined initialization value, a slope index value and an offset index value; determine, based on the slope index value, a value of a parameter, m; determine, based on the offset index value, a value of a parameter, n in accordance with the following equation n=(OffsetIdx*18)+1 where OffsetIdx is the offset index value; obtain an initial value of a quantization parameter associated with the independently codable unit; determine, based on the pre-defined initialization value, the parameter m, the parameter n, and the initial value of the quantization parameter, an initial probability state of the context, wherein to determine the initial probability state, the processors are further configured to determine the initial probability state based on a difference between the initial value of the quantization parameter associated with the independently codable unit and a non-zero value that defines a quantization parameter anchor point; and entropy decode, from a video bitstream and based on the initial probability state of the context, a bin of the value for the syntax element.

8. The device of claim 7, wherein, to determine the initial probability state of the context, the one or more processors are configured to determine the initial probability state of the context in the linear domain without intermediately determining the initial probability state of the context in the logarithmic domain.

9. The device of claim 7, wherein the initial value of the quantization parameter is $SliceQP_Y$.

10. The device of claim 7, wherein the value of the quantization parameter anchor point is 16.

11. The device of claim 7, wherein, to determine the initial probability state, the one or more processors are configured to determine the initial probability state in accordance with the following equation:

$$InitProbState=clip3(1,127,((m*(SliceQP_Y-QP_{anchor}))>>rshift)+n),$$

where InitProbState is the initial probability state, $SliceQP_Y$ is the initial value of the quantization parameter, $QP_{anchor}$ is the quantization parameter anchor point, and rshift is a right shift value.

12. The device of claim 7, wherein, to entropy decode the bin, the one or more processors are configured to decode the bin using context adaptive binary arithmetic coding (CABAC).

13. A method for entropy encoding of video data, the method comprising: retrieving, from a memory, a pre-defined initialization value for a context of a plurality of contexts used in a context-adaptive entropy coding process to entropy code a value for a syntax element for an independently codable unit of video data; determining, based on the pre-defined initialization value, a slope index value and an offset index value: determining, based on the slope index value, a value of a parameter, m; determining, based on the offset index value, a value of a parameter, n in accordance with the following equation n=(OffsetIdx*18)+1 where OffsetIdx is the offset index value; obtaining an initial value of a quantization parameter associated with the independently codable unit; determining, based on the pre-defined initialization value, the parameter m, the parameter n, and the initial value of the quantization parameter, an initial probability state of the context, wherein determining the initial probability state is further based on a difference between the initial value of the quantization parameter associated with the independently codable unit and a non-zero value that defines a quantization parameter anchor point; and entropy encoding, in a video bitstream and based on the initial probability state of the context, a bin of the value for the syntax element.

14. The method of claim 13, wherein determining the initial probability state of the context comprises determining the initial probability state of the context in the linear domain without intermediately determining the initial probability state of the context in the logarithmic domain.

15. The method of claim 13, wherein the initial value of the quantization parameter is $SliceQP_Y$.

16. The method of claim 13, wherein the value of the quantization parameter anchor point is 16.

17. The method of claim 13, wherein determining the initial probability state comprises determining the initial probability state in accordance with the following equation:

$$InitProbState = clip3(1,127,((m*(SliceQP_Y-QP_{anchor})) >> rshift)+n),$$

where InitProbState is the initial probability state, $SliceQP_Y$ is the initial value of the quantization parameter, $QP_{anchor}$ is the quantization parameter anchor point, and rshift is a right shift value.

18. A video encoding device comprising: a memory storing video data; and one or more processors implemented in circuitry and configured to: retrieve, from the memory, a pre-defined initialization value for a context of a plurality of contexts used in a context-adaptive entropy coding process to entropy code a value for a syntax element for an independently codable unit of video data; determine, based on the pre-defined initialization value, a slope index value and an offset index value; determine, based on the slope index value, a value of a parameter, m; determine, based on the offset index value, a value of a parameter, n in accordance with the following equation n=(OffsetIdx*18)+1 where OffsetIdx is the offset index value; obtain an initial value of a quantization parameter associated with the independently codable unit; determine, based on the pre-defined initialization value, the parameter m, the parameter n, and the initial value of the quantization parameter, an initial probability state of the context, wherein to determine the initial probability state, the processors are further configured to determine the initial probability state based on a difference between the initial value of the quantization parameter associated with the independently codable unit and a non-zero value that defines a quantization parameter anchor point; and entropy encode, in a video bitstream and based on the initial probability state of the context, a bin of the value for the syntax element.

19. The device of claim 18, wherein, to determine the initial probability state of the context in the linear domain, the one or more processors are configured to determine the initial probability state of the context in a linear domain without intermediately determining the initial probability state of the context in the logarithmic domain.

20. The device of claim 18, wherein the initial value of the quantization parameter is $SliceQP_Y$.

21. The device of claim 18, wherein the value of the quantization parameter anchor point is 16.

22. The device of claim 18, wherein, to determine the initial probability state, the one or more processors are configured to determine the initial probability state in accordance with the following equation:

$$InitProbState = clip3(1,127,((m*(SliceQP_Y-QP_{anchor})) >> rshift)+n),$$

where InitProbState is the initial probability state, $SliceQP_Y$ is the initial value of the quantization parameter, $QP_{anchor}$ is the quantization parameter anchor point, and rshift is a right shift value.

23. A device comprising: means for obtaining a pre-defined initialization value for a context of a plurality of contexts used in a context-adaptive entropy coding process to entropy code a value for a syntax element for an independently codable unit of video data; means for determining, based on the pre-defined initialization value, a slope index value and an offset index value; means for determining, based on the slope index value, a value of a parameter, m; means for determining, based on die offset index value, a value of a parameter, n in accordance with the following equation n=(OffsetIdx*18)+1 where OffsetIdx is the offset index value; means for obtaining an initial value of a quantization parameter associated with the independently codable unit; means for determining, based on the pre-defined initialization value, the parameter m, the parameter n, and the initial value of the quantization parameter, an initial probability state of the context, wherein the means for determining the initial probability state comprises means for determining the initial probability state based on a difference between the initial value of the quantization parameter associated with the independently codable unit and a non-zero value that defines a quantization parameter anchor point; and means for entropy decoding, from a bitstream and based on the initial probability state of the context, a bin of the value for the syntax element.

24. A non-transitory computer-readable storage medium storing instructions that, when executed, cause one or more processors of a video coder to: obtain a pre-defined initialization value for a context of a plurality of contexts used in a context-adaptive entropy coding process to entropy code a value for a syntax element for an independently codable unit of video data; determine, based on the pre-defined initialization value, a slope index value and an offset index value; determine, based on the slope index value, a value of a parameter, m; determine, based on the offset index value, a value of a parameter, n in accordance with the following equation n=(OffsetIdx*18)+1 where OffsetIdx is the offset index value; obtain an initial value of a quantization parameter associated with the independently codable unit; determine, based on the pre-defined initialization value, the parameter m, the parameter n, and the initial value of the quantization parameter, an initial probability state of the context, wherein to determine the initial probability state, the processors are further configured to determine the initial probability state based on a difference between the initial value of the quantization parameter associated with the independently codable unit and a non-zero value that defines a quantization parameter anchor point; and entropy encode, in a bitstream and based on the initial probability state of the context, a bin of the value for the syntax element.

* * * * *